United States Patent
Zuo et al.

(10) Patent No.: US 12,270,897 B1
(45) Date of Patent: Apr. 8, 2025

(54) TIME SERIES InSAR TROPOSPHERIC DELAY CORRECTION IN COMPLEX MOUNTAINOUS AREAS

(71) Applicant: KUNMING UNIVERSITY OF SCIENCE AND TECHNOLOGY, Kunming (CN)

(72) Inventors: Xiaoqing Zuo, Kunming (CN); Shipeng Guo, Kunming (CN); Weiwei Song, Kunming (CN); Yongfa Li, Kunming (CN); Jihong Zhang, Kunming (CN); Daming Zhu, Kunming (CN); Cheng Huang, Kunming (CN); Zhuohui Xiao, Kunming (CN); Menghua Li, Kunming (CN); Sumin Li, Kunming (CN); Qingwang Wang, Kunming (CN)

(73) Assignee: KUNMING UNIVERSITY OF SCIENCE AND TECHNOLOGY, Kunming (CN)

( * ) Notice: Subject to any disclaimer, the term of this patent is extended or adjusted under 35 U.S.C. 154(b) by 0 days.

(21) Appl. No.: 18/794,484

(22) Filed: Aug. 5, 2024

(30) Foreign Application Priority Data

Dec. 15, 2023 (CN) .......................... 202311728025.9

(51) Int. Cl.
 *G01S 13/90* (2006.01)
 *G01S 7/40* (2006.01)
(52) U.S. Cl.
 CPC ........ *G01S 13/9023* (2013.01); *G01S 7/4021* (2013.01)

(58) Field of Classification Search
 CPC .......................... G01S 13/9023; G01S 7/4021
 See application file for complete search history.

(56) References Cited

FOREIGN PATENT DOCUMENTS

| CN | 101770027 | A | * | 7/2010 | |
|---|---|---|---|---|---|
| CN | 105136073 | A | | 12/2015 | |
| CN | 109782282 | A | | 5/2019 | |
| CN | 110031841 | | * | 7/2019 | |
| CN | 110031841 | A | * | 7/2019 | |
| CN | 110174044 | A | * | 8/2019 | ............... G01B 7/02 |

(Continued)

OTHER PUBLICATIONS

He Yonghong, et al., InSAR Tropospheric Delay Error Correction Algorithm based on Multi-Scale Correlation Analysis. Journal of Geo-Information Science, 09. Date of issue : Sep. 21, 2020. (abstract translated) Related pp. 130-138, Related claims: 1-6.

(Continued)

*Primary Examiner* — Timothy A Brainard

(57) ABSTRACT

Disclosed is a time series InSAR tropospheric delay correction method for relieving atmospheric seasonal oscillation, so as to relieve the seasonal oscillation deviation caused by tropospheric delay. This method is based on the temporal and spatial characteristics of atmospheric delay. Firstly, based on the ERA-5 atmospheric grid data covering the study area, the ZTD negative exponential vertical profile function model is established. Fourier series function is introduced to establish the time series model for $\beta$ and $ZTD_r$. Finally, according to the radar incidence angle parameters, the delay is changed from zenith direction to radar line of sight direction.

6 Claims, 25 Drawing Sheets

(56) References Cited

FOREIGN PATENT DOCUMENTS

| CN | 115980751 A | | 4/2023 | |
|---|---|---|---|---|
| CN | 116338607 A | | 6/2023 | |
| DE | 102011076604 A1 | * | 7/2012 | ............. G01S 19/04 |
| EP | 3156818 A1 | | 4/2017 | |

OTHER PUBLICATIONS

Qihang Yang et al., Evaluation of InSAR Tropospheric Delay Correction Methods in the Plateau Monsoon Climate Region Considering Spatial-Temporal Variability, Sensors, vol. 23, No. 23. Date of issue : Dec. 2, 2023. Related pp. 1-29. Related claims: 1-6.

Li Langyang, et al., Combined LiCSBAS and machine learning ground monitoring and prediction method for Kunming city, Bulletin of Surveying and Mapping, vol. 2023, No. 7. Date of issue : Jul. 31, 2023. (abstract translated) Related pp. 119-124. Related claims: 1-6.

Li Sihui, et al., Time-series InSAR tropospheric atmospheric delay correction based on common scene stacking, Journal of Remote Sensing, vol. 27, No. 10. Date of issue: Oct. 31, 2023. (abstract translated) Related pp. 2406-2417. Related claims: 1-6.

Roghayeh Shamshiri, et al., Improving tropospheric corrections on large-scale Sentinel-1 interferograms using a machine learning approach for integration with GNSS-derived zenith total delay (ZTD), Remote Sensing of Environment, vol. 239. Date of issue : Mar. 15, 2020. Related pp. 1-14. Related claims: 1-6.

Retrieval report dated Apr. 29, 2024 in SIPO application 202311728025.9.

Retrieval report dated May 9, 2024 in SIPO application 202311728025.9.

Notice of the First Office action dated May 1, 2024 in SIPO application 202311728025.9.

Notice to Grant dated May 11, 2024 in SIPO application 202311728025.9.

* cited by examiner

TIME SERIES InSAR TROPOSPHERIC DELAY CORRECTION IN COMPLEX MOUNTAINOUS AREAS

CROSS-REFERENCE TO RELATED APPLICATIONS

This application claims priority to Chinese Patent Application No. 202311728025.9, filed on Dec. 15, 2023, the contents of which are hereby incorporated by reference.

TECHNICAL FIELD

The disclosure belongs to the field of interferometric synthetic aperture radar (InSAR), and in particular relates to a time-series InSAR tropospheric delay correction method for relieving atmospheric seasonal oscillation.

BACKGROUND

The development of InSAR technology makes it possible to realize scientific and efficient wide-area deformation monitoring, such as inversion of surface displacement maps related to a wide range of geophysical processes, including volcanic mountains and earthquakes, slow tectonic movement, urban surface deformation caused by human activities, etc., which has greater advantages than traditional geodetic methods such as GPS and leveling. The more advanced time-series InSAR technology, represented by PS-InSAR and SBAS-InSAR, is used to extract the time evolution of ground deformation from a group of repeated SAR images, and the deformation accuracy may reach millimeters. Unfortunately, tropospheric delay is still the main factor that restricts the monitoring of surface displacement by time series InSAR.

Tropospheric delay includes hydrostatic delay and wet delay, which are usually estimated by simulating vertical stratification and turbulent mixing delay in InSAR application respectively. The first kind is based on statistical methods, which weaken the influence of tropospheric delay by assuming that the tropospheric delay obeys random distribution in time dimension, such as stacking or spatial and temporal filtering method. The tropospheric delay has both seasonal periodic system term signals and non-seasonal random term signals in time dimension. It is a challenge for the seasonal periodic system term signals to do the effective separation by spatial and temporal filtering. The second kind is to estimate tropospheric delay based on the linear empirical relationship between interferometric phase and elevation, such as linear model and multi-temporal moving-window linear model. However, these methods need prior deformation information and do not consider the spatial variability of the atmosphere. Although the power-law model takes into account the spatial variability of atmospheric delay, this method is only suitable for stratified delay closely related to terrain, and atmospheric delay needs to have power-law variation. The third kind is to estimate tropospheric delay by using external auxiliary data, such as GPS measurement, multispectral technology to obtain water vapor data and numerical gas image model data. The advantage of this kind is that priori information of surface deformation are not necessary, and the atmospheric delay may be directly estimated from the required meteorological elements. At present, the method of using meteorological reanalysis data to simulate atmospheric delay and altitude function has achieved good correction effect. This method allows near-real-time estimation of atmospheric variables such as temperature, pressure and relative humidity at regular time intervals on global or regional spatial grids, which has the advantages of being available in global coverage and near-real-time applications. However, the two main challenges of InSAR atmospheric delay correction with meteorological reanalysis data are: how to accurately and simultaneously describe the tropospheric spatial and temporal variation characteristics, which is helpful to model the seasonal oscillation signal of atmospheric delay; and how to solve the problem that the spatial resolution of SAR is inconsistent with the spatial resolution of meteorological data (interpolation accuracy problem), which is helpful to accurately calculate the atmospheric delay phase of any InSAR coherent point.

SUMMARY

In order to solve the problem of seasonal oscillation deviation caused by atmospheric delay in the process of InSAR deformation calculation under long time series, the disclosure provides a time series InSAR tropospheric delay correction method for relieving atmospheric seasonal oscillation to relieve the seasonal oscillation deviation caused by tropospheric delay. This method is based on the temporal and spatial characteristics of atmospheric delay. Firstly, based on the ERA-5 atmospheric grid data covering the study area, the ZTD negative exponential vertical profile function model is established. The reference points of the model are restricted to the surface, and the surface ZTD ($ZTD_r$) and elevation decline factor ($\beta$) are used to describe the stratified atmospheric change, and Fourier series function is introduced to establish the time series model for $\beta$ and $ZTD_r$. Considering the spatial variation characteristics of tropospheric delay, there will be errors in directly interpolating ZTD at the position of high-coherence point by using $ZTD_r$ on the grid points around the high-coherence point. The strategy of the disclosure is to use four grid data with the same height as the high-coherence point to interpolate the atmospheric delay of the high-coherence point with inverse distance weight. Finally, according to the radar incidence angle parameters, the delay is changed from zenith direction to radar line of sight direction, which helps the time series InSAR to calculate the deformation displacement.

In order to solve the technical problems, the basic idea of the technical scheme adopt by the disclosure is as follows.

A time-series InSAR tropospheric delay correction method for relieving atmospheric seasonal oscillation, including the following steps:

S1, data preparation: collecting SAR images (original SLC data and corresponding orbit data), ERA-5 meteorological reanalysis data and DEM data with 30-meter resolution under the repeated orbit of N+1 scenes in the study area.

S2, interferogram calculation: registering N slave images with master images, then performing interferometric calculation among multiple master images based on spatial and temporal baseline criteria to obtain M interferograms, simulating topographic phase by DEM, and subtracting from the interferograms to obtain M differential interferograms;

S3, phase unwrapping: selecting high-coherence points higher than a coherence threshold to carry out 3-dimensional phase unwrapping, and using the high-coherence points to fit orbit phase trend by a polynomial to correct orbit error, so as to obtain unwrapping phase information of the high-coherence points;

S4, extracting surface and stratified meteorological parameter factors: based on the collected ERA-5 meteorological reanalysis data, extracting the surface (air pressure, temperature and dew point temperature) and stratified meteorological parameters (high potential, air pressure, temperature and dew point temperature) at hourly intervals, and performing a calculation to obtain the saturated water vapor pressure $e_{sat}$, specific humidity factor $q_{sat}$ and water vapor pressure factor e;

S5, calculating surface ZTD and stratified ZTD: performing integral calculation on stratified ZHD, stratified ZWD, surface ZHD and surface ZWD by using extracted ERA-5 surface and stratified meteorological parameters along a zenith path, so as to obtain surface ZTD ($ZTD_r$) and stratified ZTD;

S6, constructing a time-series InSAR atmospheric delay correction model: constructing a negative exponential function model based on the stratified ZTD and corresponding elevation values, fitting an elevation decline factor ($\beta$) in the model by using a least square algorithm, and then fitting the elevation decline factor $\beta$ and the $ZTD_r$ in a time dimension with hours as step lengths by using Fourier series functions of annual period, semi-annual period and daily period, so as to establish a ZTD spatial and temporal function model of any time grid point;

S7, accurate calculation of atmospheric delay of high-coherence points: based on the ZTD spatial and temporal model constructed in the S6, determining atmospheric delay weight of surrounding ZTD model by a spatial distance between high-coherence target points and the ZTD model of surrounding grid points, so as to calculate accurate ZTD values of the target points by spatial interpolation, and projecting the ZTD onto the radar line of sight by using an incidence angle and a radar wavelength, and obtaining an atmospheric delay phase by a calculation;

S8, evaluation of model performance: comprehensively evaluating the performance of the model through internal accord and external accord accuracy verification.

Optionally, in step S4, the saturated water vapor pressure $e_{sat}$, the specific humidity factor $q_{sat}$ and the water vapor pressure e are calculated according to the following formulas:

$$\ln e_{sat} = \ln 611.21 + \frac{17.62 \times (\text{dewTemp} - 273.16)}{\text{dewTemp} - 32.19}$$

$$q_{sat} = \left(\frac{287.0597}{461.525 \times e_{sat}}\right) \bigg/ \left(P - \left(1 - \frac{287.0597}{461.525}\right) \times e_{sat}\right)$$

$$e = \frac{q_{sat} \times P}{0.622}$$

where dewTemp and P represent the stratified dew point temperature and stratified air pressure extracted from each grid point, respectively.

Optionally, in step S5, zenith hydrostatic delay (ZHD), zenith wet delay (ZWD) and zenith total delay (ZTD) are calculated according to the following formulas:

$$ZHD = 10^{-6} \int_{Z_0}^{Z_{top}} k_1 \frac{P}{T} dz$$

$$ZWD = 10^{-6} \int_{Z_0}^{Z_{top}} \left(k'_2 \frac{e}{T} + k_3 \frac{e}{T^2}\right) dz$$

$$ZTD = ZHD + ZWD$$

where T represents Kelvin temperature; $k_1 = 0.776$ $KPa^{-1}$, $k'_2 = 0.233$ $KPa^{-1}$, $k_3 = 3.75 \times 10^3 K^2$ $Pa^{-1}$.

Optionally, in step S6, the ZTD spatial and temporal model of each grid point is capable of being specifically expressed as:

S61, restricting a reference point $ZTD_r$ to a surface, and establishing a negative exponential function to describe a variation of stratified atmospheric delay with an elevation at any grid point, $$ZTD = ZTD_r \cdot e^{(h-h_r) \cdot \beta}$$

where $h_r$ represents the elevation of the surface reference point; $ZTD_r$ stands for surface ZTD.

S62, taking a one-hour time interval as a step length, calculating a fitted R based on a weighted least square algorithm;

S63, modeling time series $ZTD_r(DOY, hod)$ and $\beta(DOY, hod)$ respectively by using Fourier series function considering annual period, semi-annual period and daily period, $$\beta(DOY, hod) = A_0 + A_1\cos\left(\frac{DOY}{365.25}2\pi\right) + A_2\sin\left(\frac{DOY}{365.25}2\pi\right) +$$
$$A_3\cos\left(\frac{DOY}{365.25}4\pi\right) + A_4\sin\left(\frac{DOY}{365.25}4\pi\right) + A_5\cos\left(\frac{hod}{24}2\pi\right) + A_6\sin\left(\frac{hod}{24}2\pi\right)$$

$$ZTD_r(DOY, hod) = B_0 + B_1\cos\left(\frac{DOY}{365.25}2\pi\right) + B_2\sin\left(\frac{DOY}{365.25}2\pi\right) +$$
$$B_3\cos\left(\frac{DOY}{365.25}4\pi\right) + B_4\sin\left(\frac{DOY}{365.25}4\pi\right) + B_5\cos\left(\frac{hod}{24}2\pi\right) + B_6\sin\left(\frac{hod}{24}2\pi\right)$$

where $A_i$ and $B_i$ represent model coefficients of $\beta(DOY, hod)$ and $ZTD_r(DOY, hod)$ respectively, DOY represents a day when the model is input, and hod represents a hour when the model is input.

S64, combining the S61 and the S63, obtaining a final spatial and temporal model of ZTD grid: $ZTD = ZTD_r(DOY, hod) \cdot e^{(h-h_r) \cdot \beta(DOY, hod)}$.

Optionally, the step S7 specifically includes:

S71, according to positions of the high-coherence points and DEM, extracting X, Y, and Z 3-dimensional information of the target points;

S72, determining four ERA-5 grid points closest to the target points by using the X, Y, and Z 3-dimensional coordinates of the target points, inputting SAR time into the $\beta(DOY, hod)$ and $ZTD_r(DOY, hod)$ models to calculate best $ZTD_r$ and $\beta$ among four grid ZTD models, and then calculating ZTD values of four surrounding ERA-5 grid models at a target elevation by using elevation values of coherent target points and a ZTD grid spatial and temporal model;

S73, interpolating the ZTD values of the target points through four surrounding ERA-5 grid points with inverse distance weight;

where in above steps, a weighted calculation formula of the ZTD of the target points through surrounding four grid points is:

$$f(p, q) = \frac{1/d_i^k}{\sum_{i=1}^{n} d_i^k} f(i, q),$$

where f(p, q) is a predicted value of atmospheric delay of point p at elevation q, f(i, q) is a measured value of a known point, and n represents a number of sampling points around a prediction point participating in an interpolation point, where n=4 is selected, and $d_i$ represents a distance between the prediction point and a known sampling point; k is a specified power, where k=2 is selected.

S74, according to the relationship between the incidence angle and the wavelength of the satellite radar, converting a ZTD into the atmospheric delay phase $\varphi_{tropo}$ in the radar line of sight direction by using the formula:

$$\varphi_{tropo} = \frac{-4\pi}{\lambda \cos\theta} ZTD$$

Optionally, in step S8, the internal accord accuracy verification is the correlation verification between the model prediction value and the test data, including verification of model parameters $ZTD_r$ and verification of accuracy of ZTD at any height of model output; and external accord accuracy verification includes the reduced amplitude of the interferometric phase standard deviation (STD) after qualitative and quantitative evaluation and correction, the decorrelation performance between phase and elevation, and the performance of relieving seasonal atmospheric delay in displacement time series.

The method may effectively correct the vertical stratification delay related to terrain fluctuation, relieve the oscillation deviation of the deformation sequence caused by the seasonal change of long-time series atmospheric delay, and improve the accuracy of time series InSAR deformation calculation. This method is independent of InSAR data itself, and is suitable for time series InSAR methods such as PS/SBAS or DS-InSAR.

After adopting the technical scheme, compared with the prior art, the disclosure has the following beneficial effects.

According to the disclosure, the convenience of obtaining ERA-5 meteorological reanalysis data free of charge all over the world is utilized, and the constructed periodic negative exponential atmospheric delay model may relieve the seasonal oscillation deviation caused by time series InSAR deformation calculation, so that the accuracy of deformation calculation is improved, the corrected interferometric phase and terrain have good decorrelation performance, and the oscillation deviation of deformation time series is obviously reduced. In addition, the method is independent of SAR data sets, and may be integrated into conventional PS-InSAR, SBAS-InSAR and DS-InSAR time series InSAR methods.

The specific embodiments of the present disclosure will be described in further detail with reference to the accompanying drawings.

BRIEF DESCRIPTION OF THE DRAWINGS

The accompanying drawings, as a part of this application, are used to provide a further understanding of the disclosure. The illustrative embodiments of the disclosure and their descriptions are used to explain the disclosure, but they do not constitute an improper limitation of the disclosure. Obviously, the attached drawings in the following description are only some examples, and other drawings may be obtained according to these drawings without creative work for ordinary people in the field. In the attached drawings.

It should be noted that these drawings and written descriptions are not intended to limit the conceptual scope of the disclosure in any way, but to explain the concept of the disclosure to those skilled in the art by referring to specific embodiments.

DETAILED DESCRIPTION OF THE EMBODIMENTS

In order to make the purpose, technical scheme and advantages of the embodiment of the present disclosure more clear, the technical scheme in the embodiment of the present disclosure will be described clearly and completely with the accompanying drawings. The following embodiments are used to illustrate the present disclosure, but are not used to limit the scope of the present disclosure.

Embodiment 1

Figure 1:
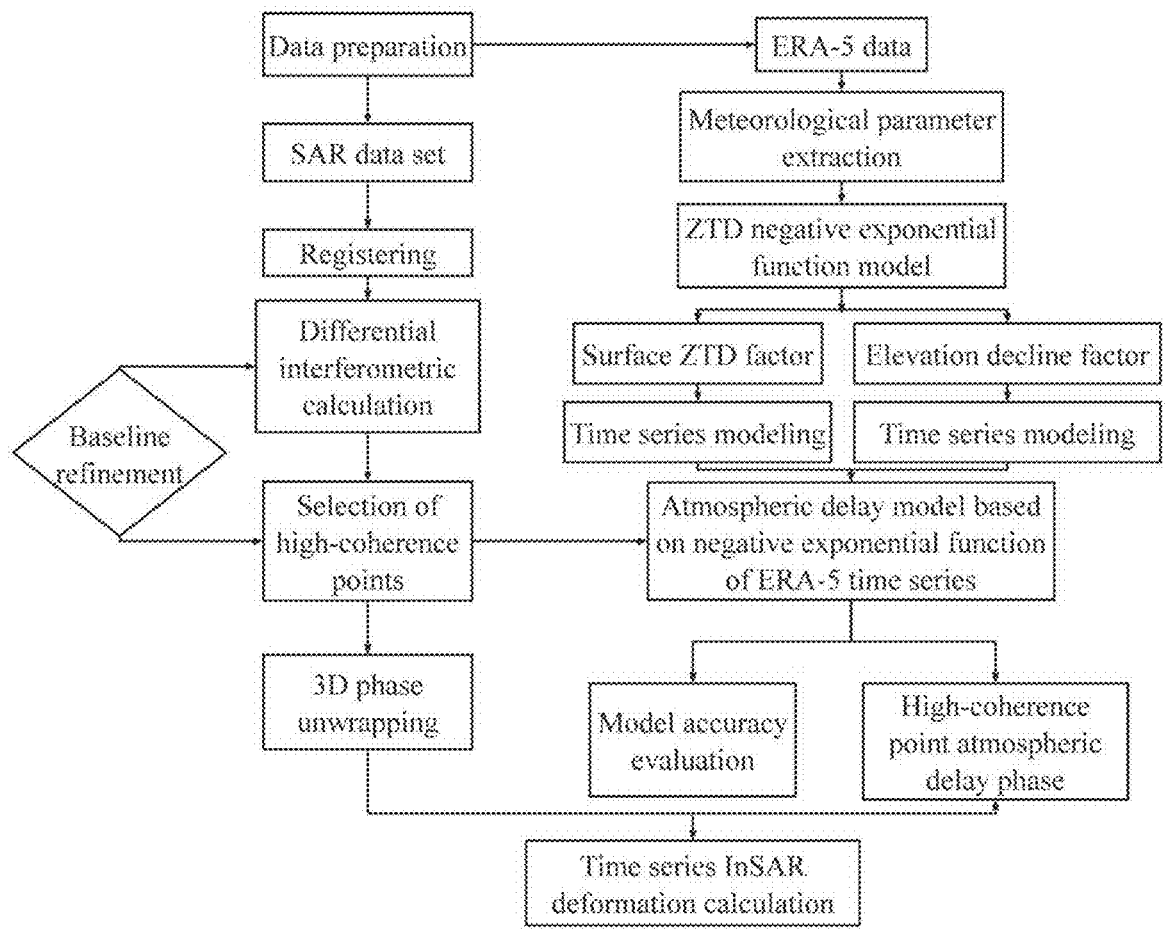
FIG. 1 is a technical flow chart of the present disclosure.

As shown in FIG. 1, a time-series InSAR tropospheric delay correction method for relieving atmospheric seasonal oscillation is described in this embodiment, including the following steps:

S1, data preparation: collecting SAR images (original SLC data and corresponding orbit data), ERA-5 meteorological reanalysis data and DEM data with 30-meter resolution under the repeated orbit of N+1 scenes in the study area.

S2, interferogram calculation: registering N slave images with master images, then performing interferometric calculation among multiple master images based on spatial and temporal baseline criteria to obtain M interferograms, simulating topographic phase by DEM, and subtracting from the interferograms to obtain M differential interferograms;

S3, phase unwrapping: selecting high-coherence points higher than a coherence threshold to carry out 3-dimensional phase unwrapping, and using the high-coherence points to fit orbit phase trend by a polynomial to correct orbit error, so as to obtain unwrapping phase information of the high-coherence points;

S4, extracting surface and stratified meteorological parameter factors: based on the collected ERA-5 meteorological reanalysis data, extracting the surface (air pressure, temperature and dew point temperature) and stratified meteorological parameters (high potential, air pressure, temperature and dew point temperature) at hourly intervals, and performing a calculation to obtain the saturated water vapor pressure $e_{sat}$, specific humidity factor $q_{sat}$ and water vapor pressure factor e;

specifically, the specific humidity factor $q_{sat}$ and the water vapor pressure factor e are calculated according to the following formulas:

$$\ln e_{sat} = \ln 611.21 + \frac{17.62 \times (dewTemp - 273.16)}{dewTemp - 32.19}$$

$$q_{sat} = \left(\frac{287.0597}{461.525 \times e_{sat}}\right) / \left(P - \left(1 - \frac{287.0597}{461.525}\right) \times e_{sat}\right)$$

$$e = \frac{q_{sat} \times P}{0.622}$$

where dewTemp and P represent the dew point temperature and air pressure extracted from ERA-5 meteorological reanalysis data, respectively;

S5, calculating the surface ZTD and the stratified ZTD: performing integral calculation on stratified ZWD, stratified ZHD, surface ZHD and surface ZWD by using extracted ERA-5 surface and stratified meteorological parameters along a zenith path, so as to obtain surface ZTD ($ZTD_r$) and stratified ZTD;

specifically, S5 includes the following steps:

S51, calculating ZHD according to the following formula;

$$ZHD = 10^{-6} \int_{Z_0}^{Z_{top}} k_1 \frac{P}{T} dz,$$

where $k_1 = 0.776$ KPa$^{-1}$, T denotes Kelvin temperature, and $Z_0$ denotes surface elevation;

S52, calculating ZWD according to the following formula;

$$ZWD = 10^{-6} \int_{Z_0}^{Z_{top}} \left(k_2' \frac{e}{T} + k_3 \frac{e}{T^2}\right) dz,$$

where $k_2' = 0.233$ KPa$^{-1}$, $k_3 = 3.75 \times 10^3$ K$^2$ Pa$^{-1}$, and e represents water vapor pressure;

S53, calculating ZTD according to the following formula;

$$ZTD = ZHD + ZWD;$$

S6, constructing a time-series InSAR atmospheric delay correction model: constructing a negative exponential function model based on the stratified ZTD and corresponding elevation values, fitting an elevation decline factor (β) in the model by using a least square algorithm, and then fitting the elevation decline factor β and the $ZTD_r$ in a time dimension with hours as step lengths by using Fourier series functions of annual period, semi-annual period and daily period, so as to establish a ZTD spatial and temporal function model of any time grid point;

specifically, step S6 includes the following steps:

S61, restricting a reference point $ZTD_r$ to a surface, and establishing a negative exponential function to describe a variation of stratified atmospheric delay with an elevation at any grid point, $$ZTD = ZTD_r \cdot e^{(h-h_r) \cdot \beta}$$

where $h_r$ represents the elevation of the surface reference point; $ZTD_r$ stands for surface ZTD;

S62, taking a one-hour time interval as a step length, calculating a fitted β based on a weighted least square algorithm;

S63, modeling time series $ZTD_r$ and β respectively by using Fourier series function considering annual period, semi-annual period and daily period, $$\beta(DOY, hod) = A_0 + A_1 \cos\left(\frac{DOY}{365.25} 2\pi\right) + A_2 \sin\left(\frac{DOY}{365.25} 2\pi\right) +$$
$$A_3 \cos\left(\frac{DOY}{365.25} 4\pi\right) + A_4 \sin\left(\frac{DOY}{365.25} 4\pi\right) + A_5 \cos\left(\frac{hod}{24} 2\pi\right) + A_6 \sin\left(\frac{hod}{24} 2\pi\right)$$

$$ZTD_r(DOY, hod) = B_0 + B_1 \cos\left(\frac{DOY}{365.25} 2\pi\right) + B_2 \sin\left(\frac{DOY}{365.25} 2\pi\right) +$$
$$B_3 \cos\left(\frac{DOY}{365.25} 4\pi\right) + B_4 \sin\left(\frac{DOY}{365.25} 4\pi\right) + B_5 \cos\left(\frac{hod}{24} 2\pi\right) + B_6 \sin\left(\frac{hod}{24} 2\pi\right)$$

where: $A_i$ and $B_i$ represent model coefficients of β(DOY, hod) and $ZTD_r$(DOY, hod) respectively, DOY represents a day when the model is input, and hod represents a hour when the model is input;

S64, combining the S61 and the S63, obtaining a final spatial and temporal model of ZTD grid: $ZTD = ZTD_r$(DOY, hod)·$e^{(h-h_r) \cdot \beta(DOY, hod)}$;

S7, accurate calculation of atmospheric delay of high-coherence points: based on the ZTD spatial and temporal model constructed in the S6, determining atmospheric delay weight of surrounding ZTD model by a spatial distance between high-coherence target points and the ZTD model of surrounding grid points, so as to calculate accurate ZTD values of the target points by spatial interpolation, and projecting the ZTD onto the radar line of sight by using an incidence angle and a radar wavelength, and obtaining an atmospheric delay phase by a calculation;

specifically, S7 includes the following steps:

S71, according to positions of the high-coherence points and DEM, extracting X, Y, and Z 3-dimensional information of the target points;

S72, determining four ERA-5 grid points closest to the target points by using the X, Y, and Z 3-dimensional coordinates of the target points, inputting SAR time into the $\beta(DOY, hod)$ and $ZTD_r(DOY, hod)$ models to calculate best $ZTD_r$ and $\beta$ among four grid ZTD models, and then calculating ZTD values of four surrounding ERA-5 grid models at a target elevation by using elevation values of coherent target points and a ZTD grid spatial and temporal model;

S73, interpolating the ZTD values of the target points through four surrounding ERA-5 grid points with inverse distance weight;

where in above steps, a weighted calculation formula of the ZTD of the target points through surrounding four grid points is:

$$f(p, q) = \frac{1/d_i^k}{\sum_{i=1}^{n} d_i^k} f(i, q),$$

where f(p, q) is a predicted value of atmospheric delay of point p at elevation q, f (i, q) is a measured value of a known point, and n represents a number of sampling points around a prediction point participating in an interpolation point, where n=4 is selected, and $d_i$ represents a distance between the prediction point and a known sampling point; k is a specified power, where k=2 is selected; and S8, evaluation of model performance: comprehensively evaluating the model performance through an internal accord and external accord accuracy verification;

specifically, the internal accord accuracy verification is a correlation verification between predicted values of the model and test data, including verification of model parameters $ZTD_r$ and verification of accuracy of ZTD at any height of model output; and the external accord verification includes qualitative and quantitative evaluation of reduction range of standard deviation (STD) of interferometric phase after correction, decorrelation performance between phase and the elevation, and performance of relieving seasonal atmospheric delay in displacement time series.

Figure 2A:
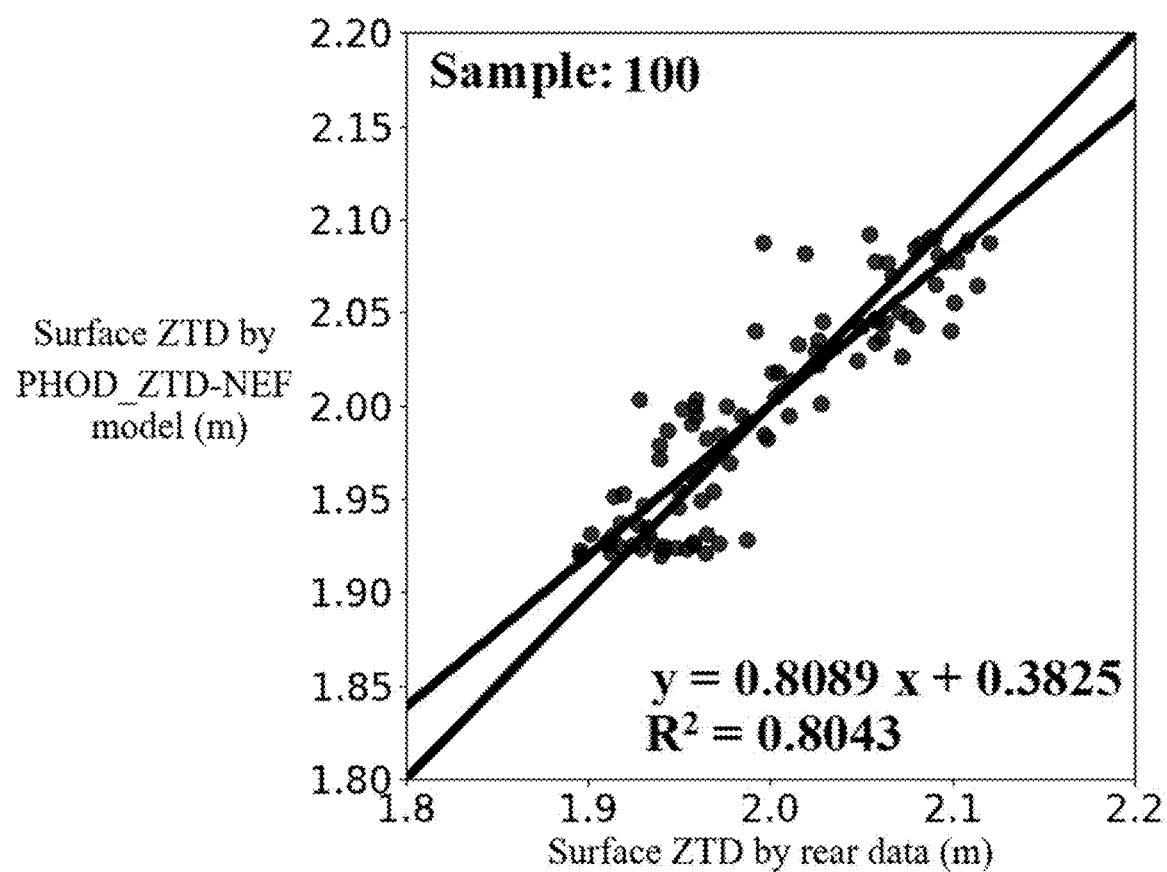
FIG. 2A is the correlation between the $ZTD_r$ values predicted by the disclosed method and the tested values when the sample size is 100.
Figure 2B:
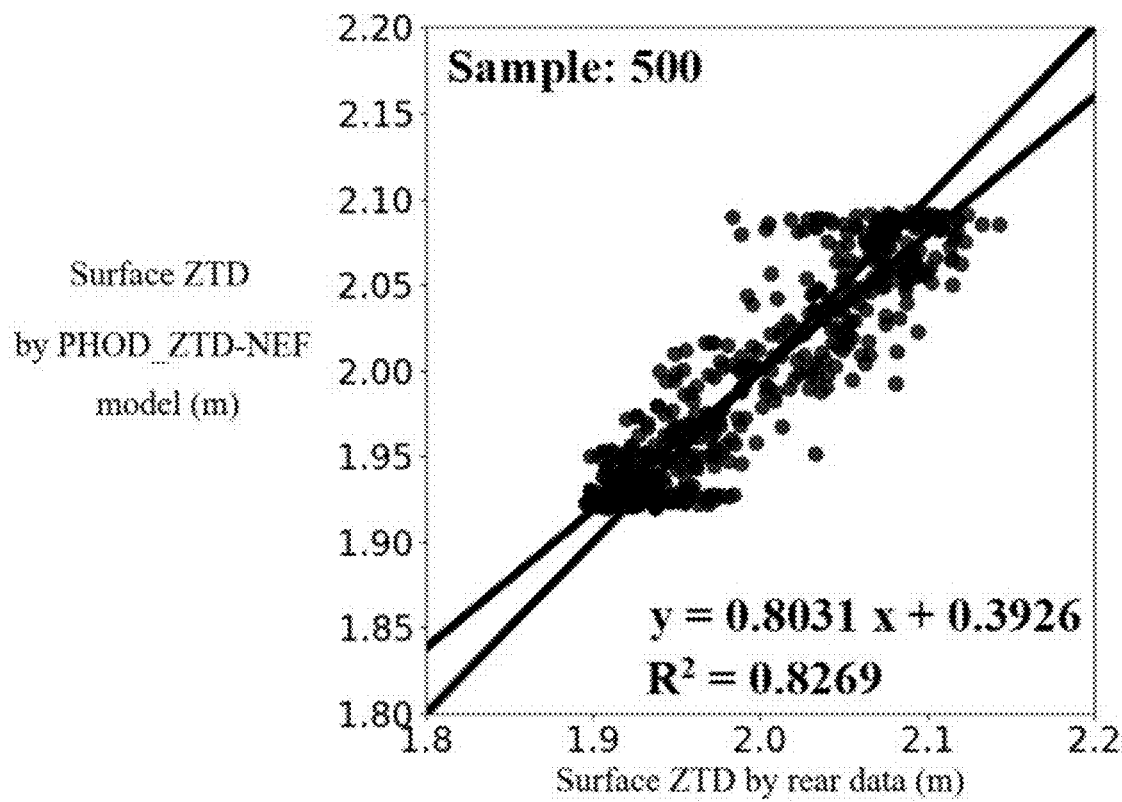
FIG. 2B is the correlation between the $ZTD_r$ values predicted by the disclosed method and the tested values when the sample size is 500.
Figure 2C:
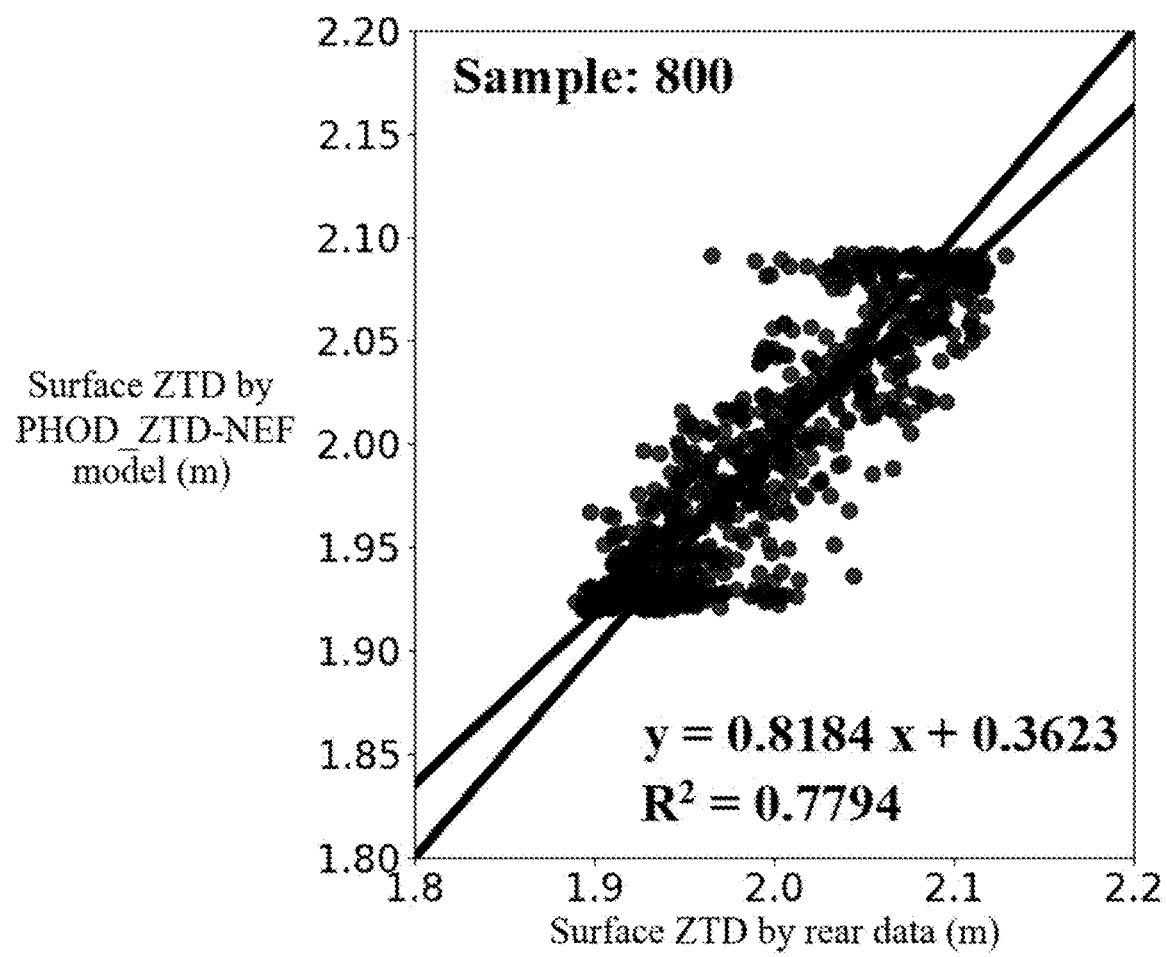
FIG. 2C is the correlation between the $ZTD_r$ values predicted by the disclosed method and the tested values when the sample size is 1000.

The hourly ERA-5 meteorological reanalysis data from 2017 to 2020 is used to model and predict the surface ZTD located at the N25 and E102 grids in Kunming. For the fitting evaluation of $ZTD_r$, 100, 500 and 800 samples are randomly selected as verification data. FIG. 2A, FIG. 2B and FIG. 2C shows the correlation diagram between the fitting value of $ZTD_r$ and the test data by the method of the present disclosure for different sample sizes. From the figures, it can be seen that the $ZTD_r$ predicted by this method has a high correlation with the test data, and the correlation coefficient numbers of three different sample sets are 0.8043, 0.9269 and 0.7794 respectively, which also shows that the method of the disclosure has high fitting capability to model parameter $ZTD_r$.

Figure 3A:
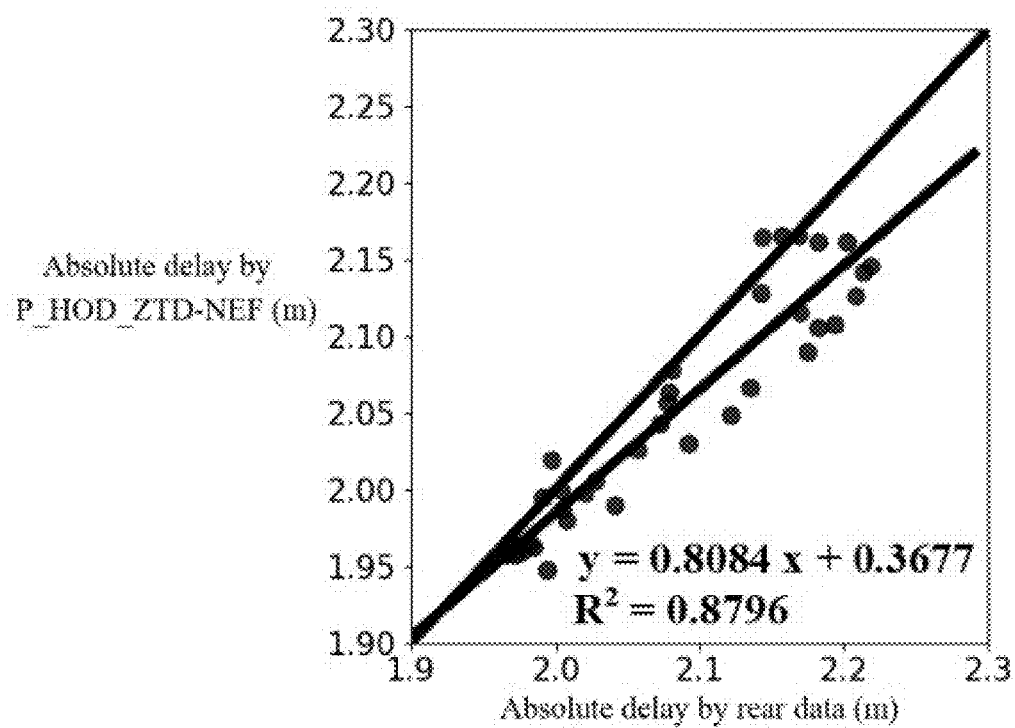
FIG. 3A is a correlation diagram between the ZTD value of the 11th layer predicted by the method of the present disclosure and the test value.
Figure 3B:
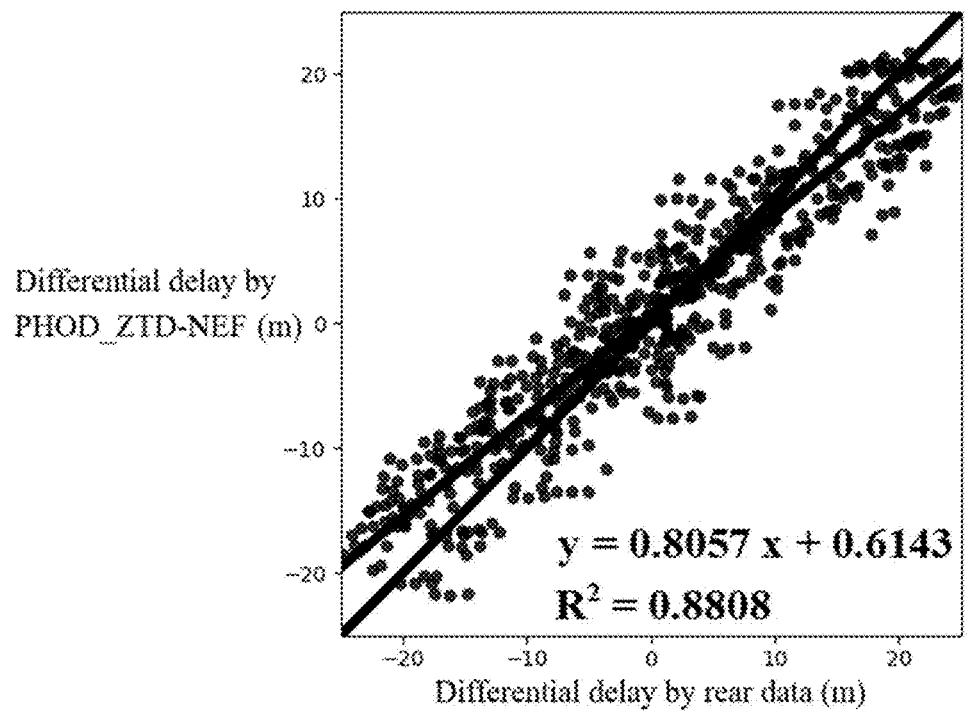
FIG. 3B is a correlation diagram between the differential ZTD value of the 11th layer predicted by the method of the present disclosure and the test value.

In order to further verify the performance of the method, 36 ERA-5 meteorological reanalysis data sets corresponding to the SAR data acquisition time are selected, the time are all at 23:00 Universal Time Code (UTC). On the basis of ERA5 meteorological data, the absolute atmospheric delay and $$\frac{(36 \times 25)}{2}$$

of the 11-th layer are calculated by the method of the disclosure and direct integration respectively, and a total of 630 differential ZTDs are obtained. Similarly, correlation diagrams for absolute atmospheric delay and differential atmospheric delay have been drawn respectively, as shown in FIG. 3A and FIG. 3B, respectively. There is little difference between the absolute ZTD calculated by the method and the actual data of 36 different periods, and the correlation coefficient reaches 0.8796. The present disclosed method is also very close to the differential ZTD obtained by the direct integration method, with a correlation coefficient of 0.8808. This shows that the method of the present disclosure may also explain the differential ZTD at any time well.

Figure 4A:
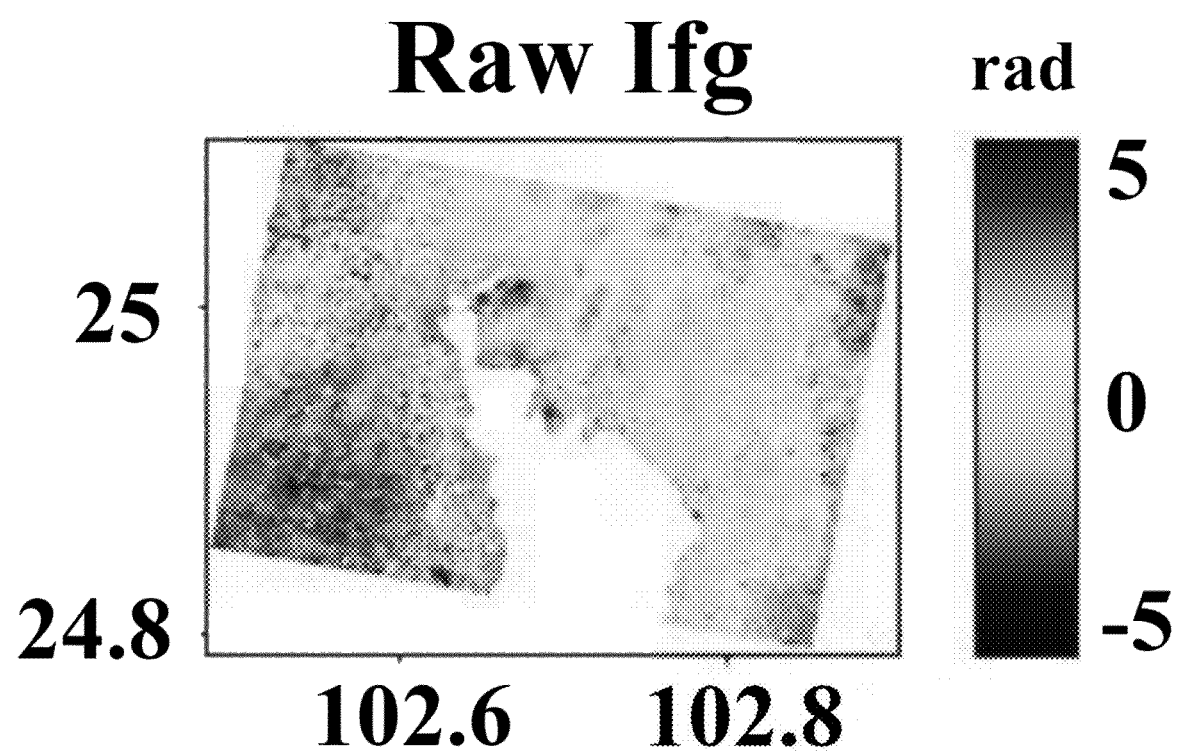
FIG. 4A is original interferogram
Figure 4B:
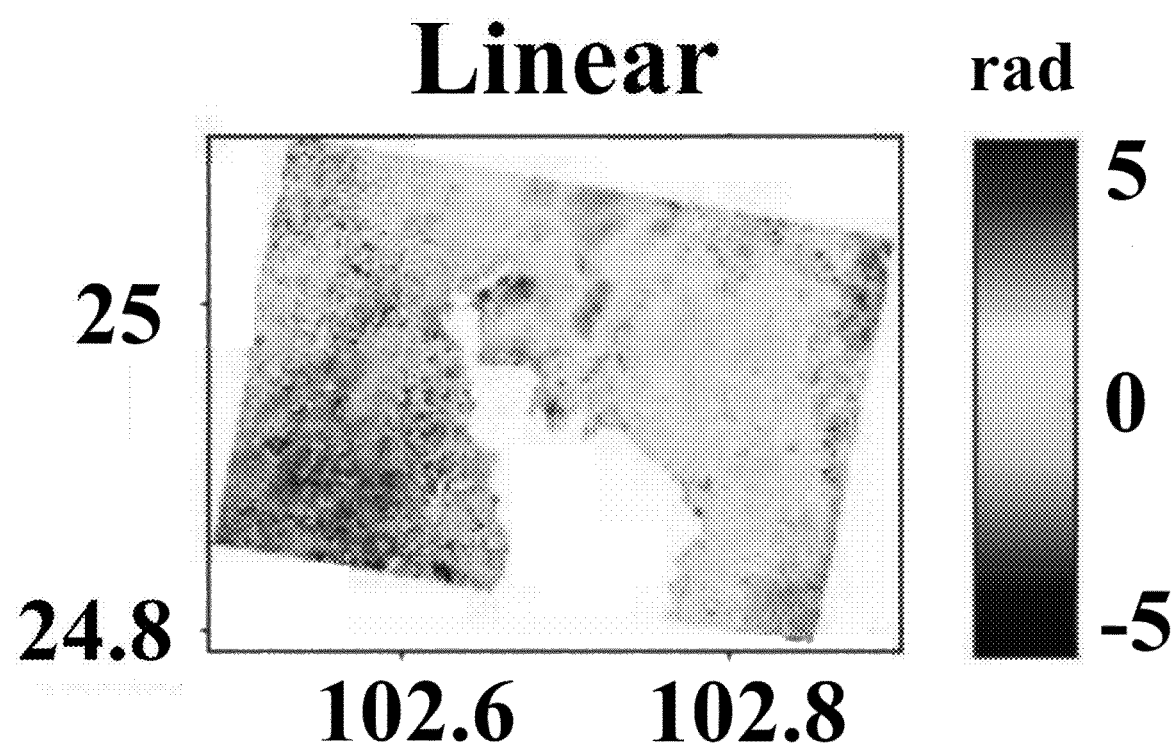
FIG. 4B is interferogram after Linear method correction
Figure 4C:
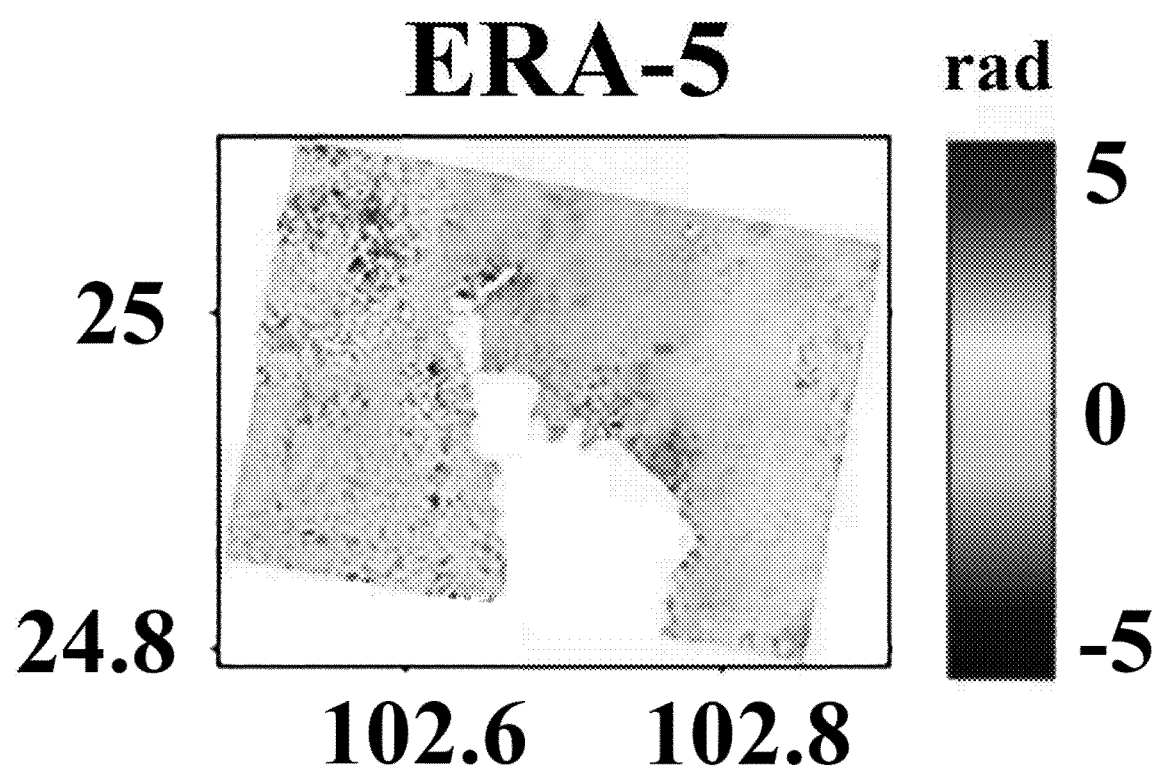
FIG. 4C is interferogram after ERA-5 method correction
Figure 4D:
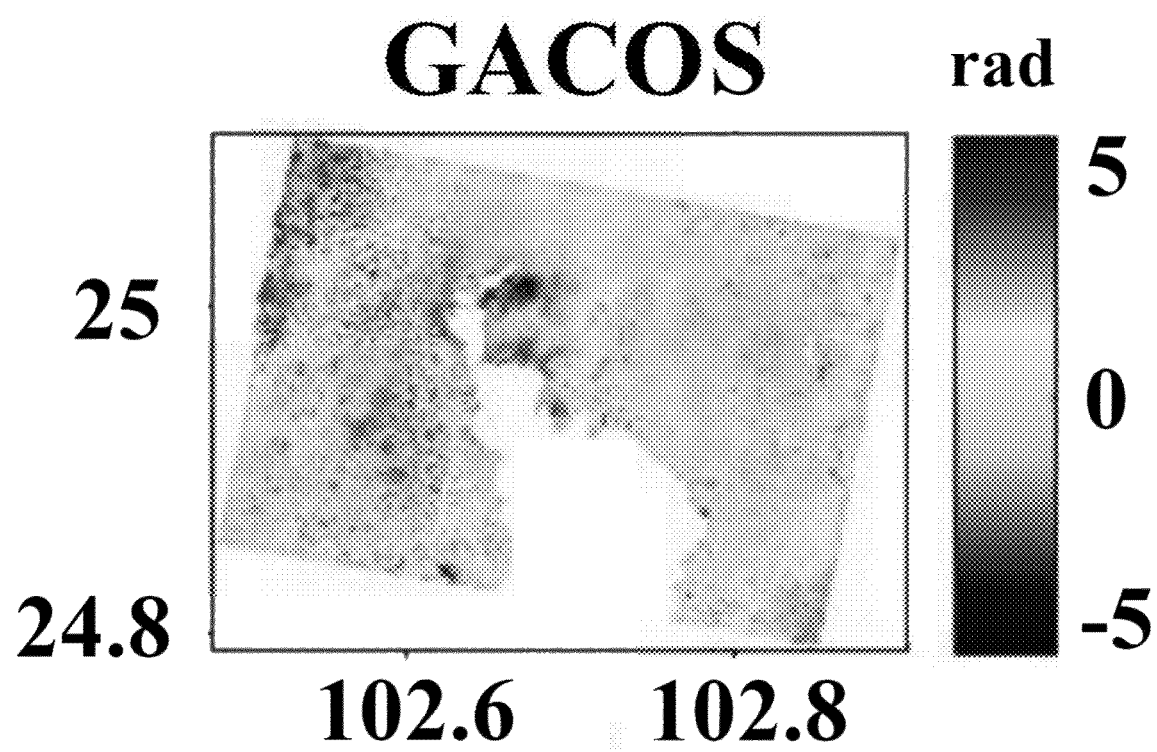
FIG. 4D is interferogram after GACOS method correction
Figure 4E:
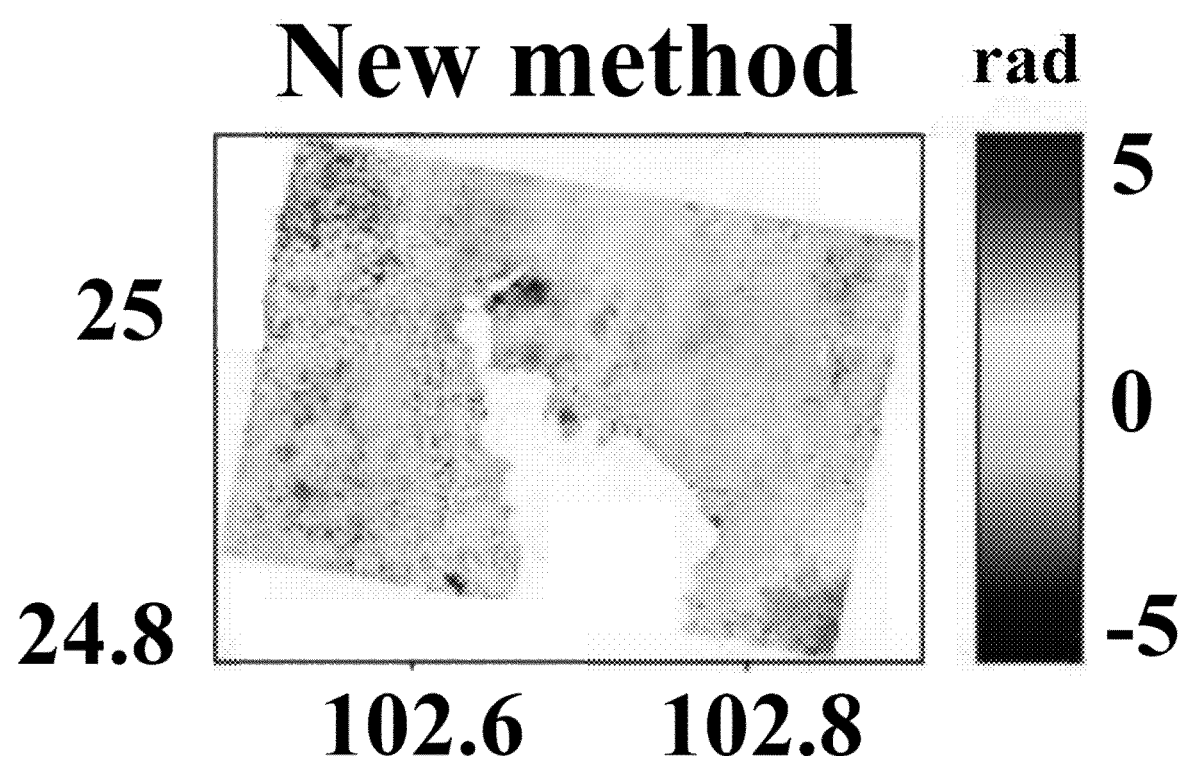
FIG. 4E is interferogram after disclosed method correction
Figure 4F:
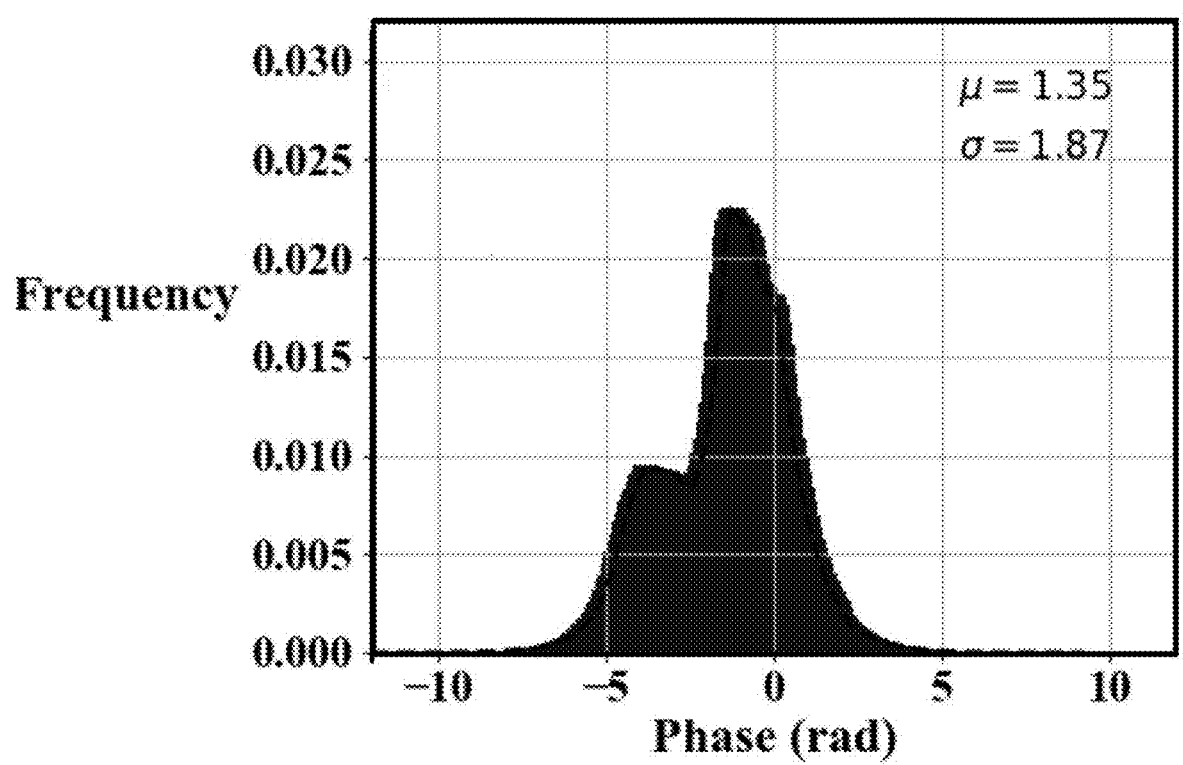
FIG. 4F is s a histogram based on the original interferogram.
Figure 4G:
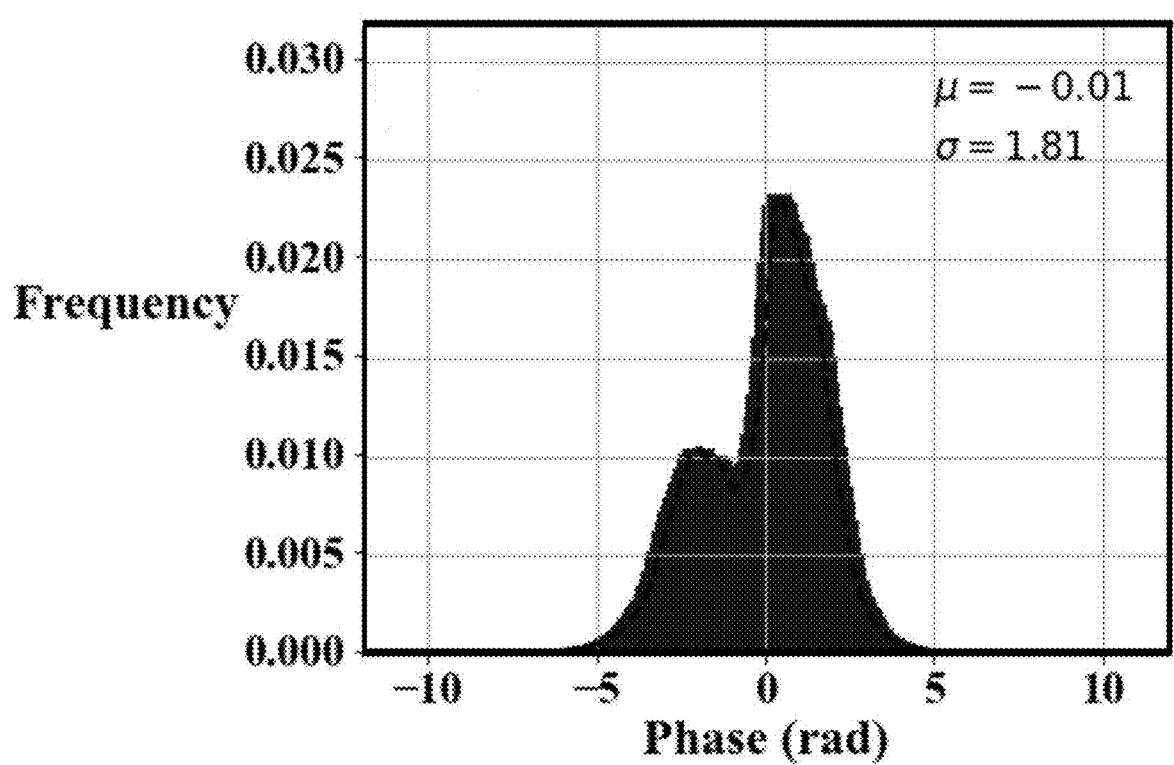
FIG. 4G is s a histogram based on the interferogram after Linear method correction.
Figure 4H:
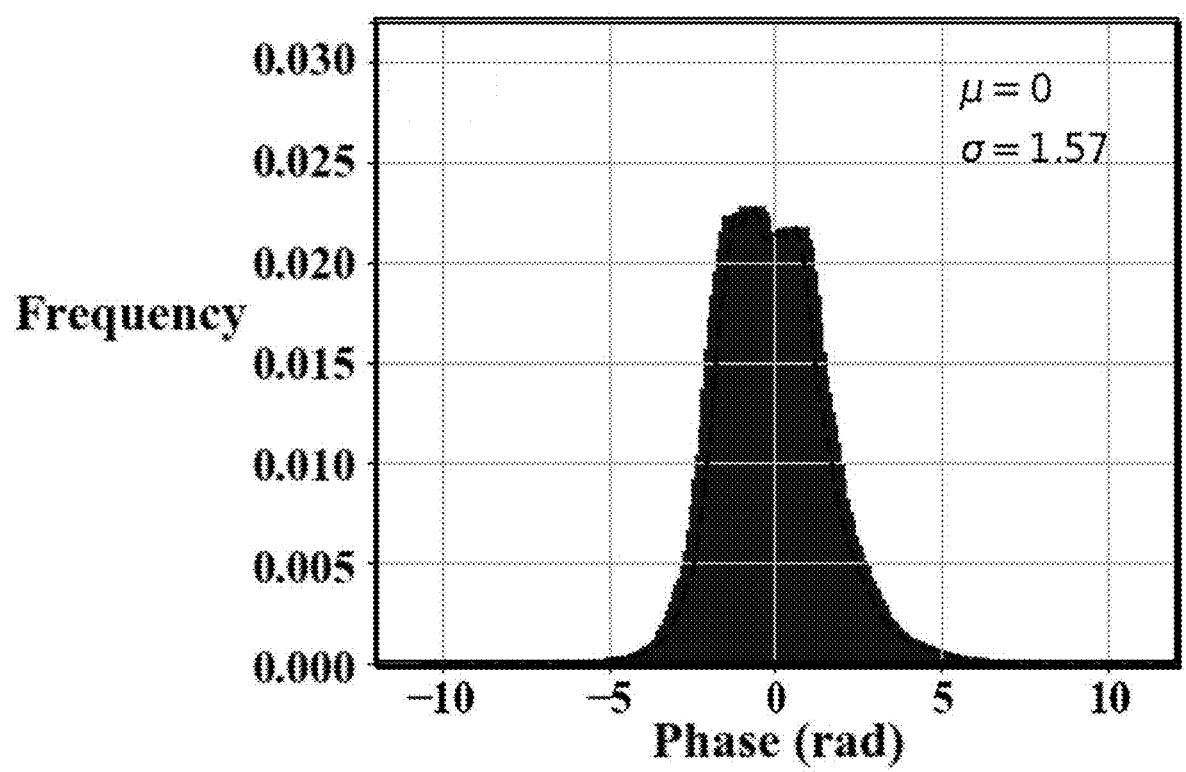
FIG. 4H is s a histogram based on the interferogram after ERA-5 method correction.
Figure 4I:
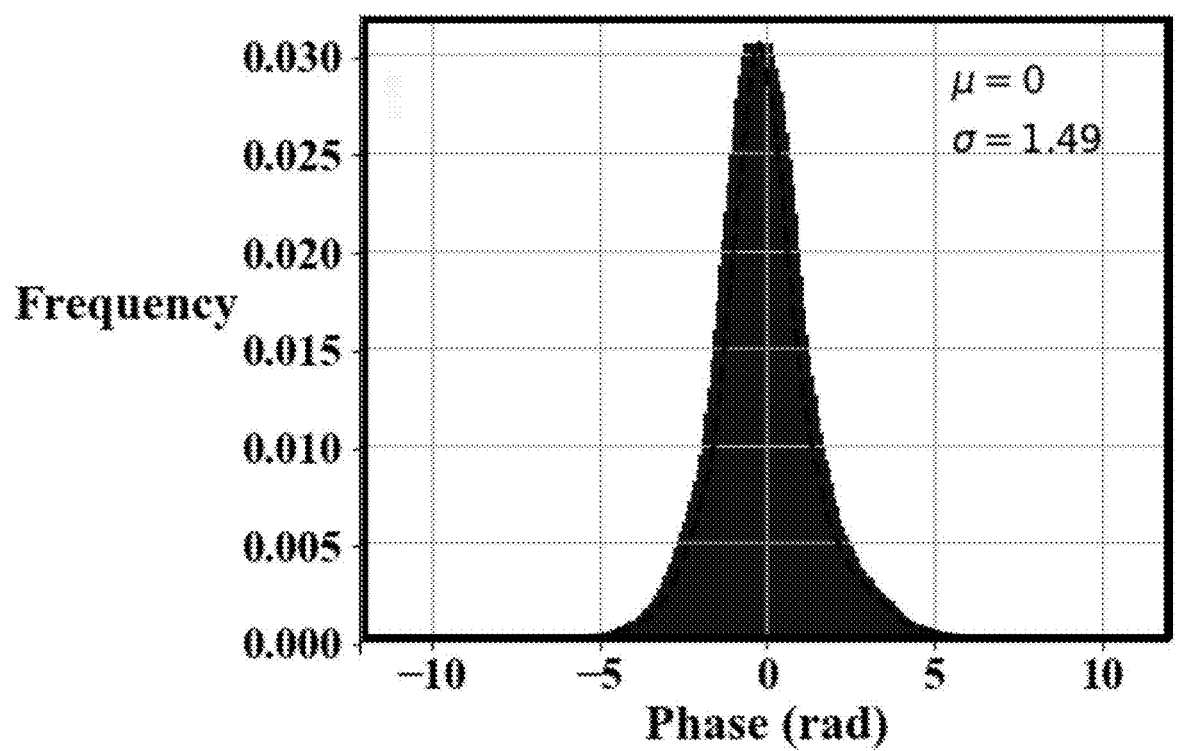
FIG. 4I is s a histogram based on the interferogram after GACOS method correction.
Figure 4J:
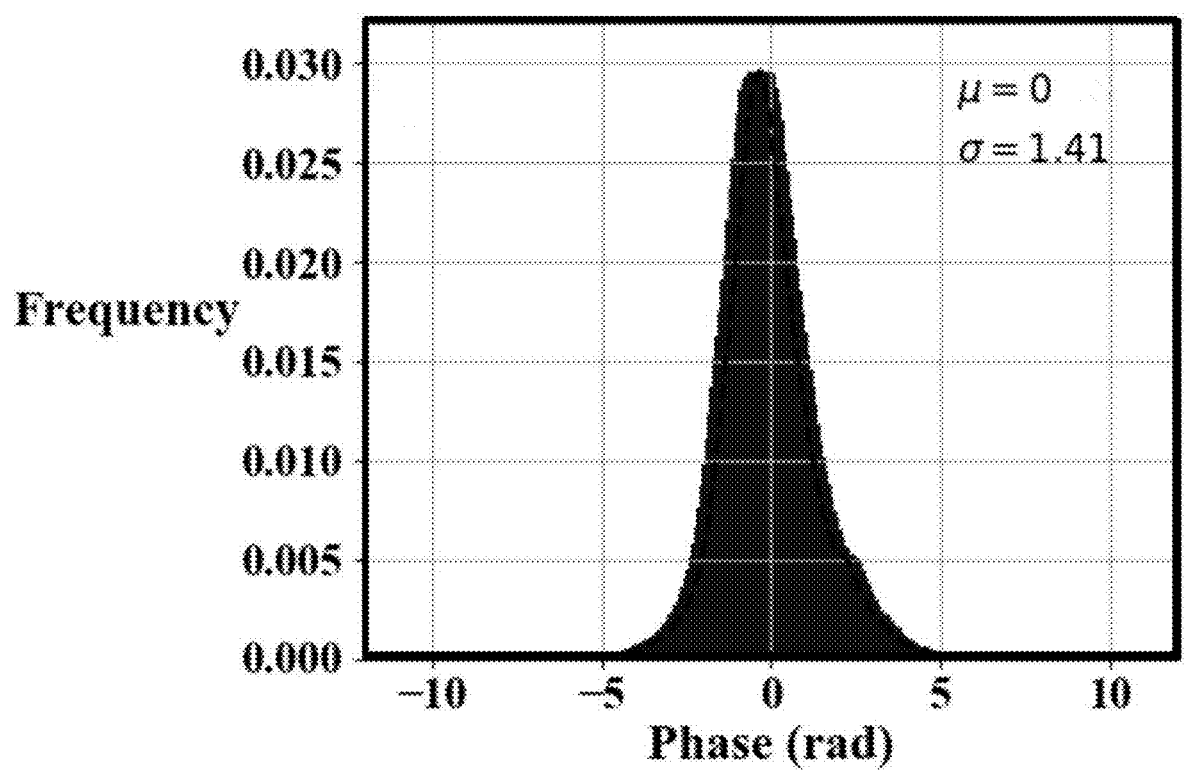
FIG. 4J is s a histogram based on the interferogram after disclosed method correction.

Optionally, the performance of the method of the present disclosure is evaluated by the external accord verification method. At first, three mainstream atmospheric delay methods (Linear, GACOS, GAMs) are compared and analyzed. FIG. 4A shows an interferogram without atmospheric delay correction. FIG. 4B, FIG. 4C, FIG. 4D and FIG. 4E shows an example of estimating tropospheric delay in Kunming using Linear, ERA5, GACOS and the present disclosure atmospheric delay correction methods, respectively. FIG. 4F shows histogram statistics of the original interferogram. FIG. 4G, FIG. 4H, FIG. 4I and FIG. 4J show histogram statistics of the corrected interferograms using the Linear, ERA5, GACOS and the present disclosure atmospheric delay correction methods, respectively. The original interferogram comes from the dry winter of 2019 (October $7^{th}$ to November $24^{th}$), and the water vapor content in the air is relatively low, and the coherence of the interferogram is also high, reaching 0.75 on the whole. Because of the slow displacement of the urban surface, no major geological disasters (such as earthquakes and landslides) have occurred, it is assumed that there is no obvious deformation of the urban surface within two months, and the deformation signal in the interferogram may be ignored. A strong convective layer signal is detected in the eastern mountainous area of the original interferogram. Although GACOS and GAMs methods have basically relieved the influence of this part of atmospheric delay, there are still anomalies in the northwest. Linear method is not effective in mountainous areas, and there is still atmospheric delay phase in eastern mountainous areas. In addition, the reduction of phase STD before and after tropospheric delay correction shows that the method of the disclosure significantly improves the atmospheric delay. On average, STD decreased from 1.87 rad (0.83 cm) to 1.41 rad (0.62 cm), great improvement has been made compared with Linear method (1.81 rad (0.81 cm)), GACOS method (1.49 rad(0.66 cm)) and GAMs method (1.57 rad(0.70 cm)).

The corrections of all interferograms are counted, and it is found that the range of reduction of the average phase standard deviation of the original interferograms after correction by the method of the present disclosure is the largest, which is superior to the other three atmospheric delay correction methods. This also shows that the method of the disclosure may well relieve the influence of tropospheric delay in the interferometric phase.

TABLE 1

Statistics of phase standard deviation changes before and after correction of 46 interferograms

| Method | Mean STD/rad | Improved IFg |
|---|---|---|
| Original | 1.60 | \ |
| Linear | 1.47 | 34 |
| GACOS | 1.45 | 28 |
| GAMs | 1.48 | 25 |
| New method | 1.27 | 38 |

Figure 5A:
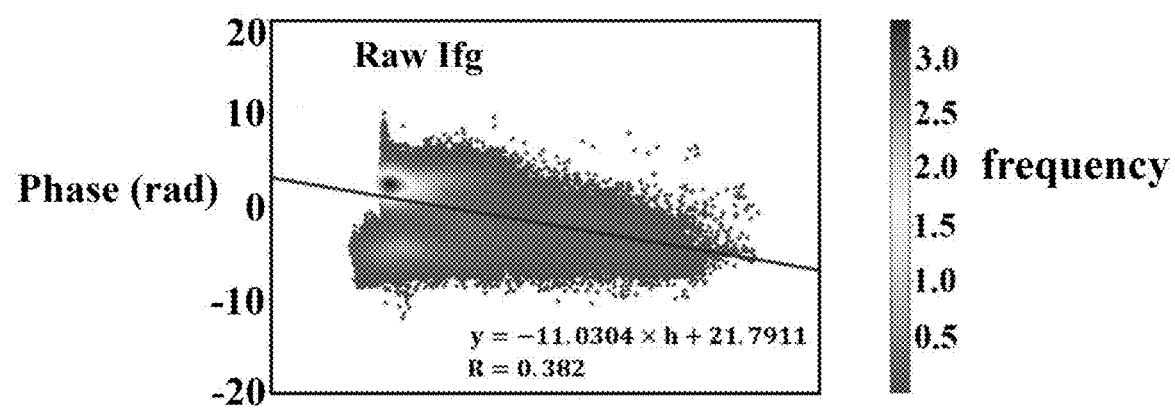
FIG. 5A is a density scatterplot of the original interferometric phase values and elevation.
Figure 5B:
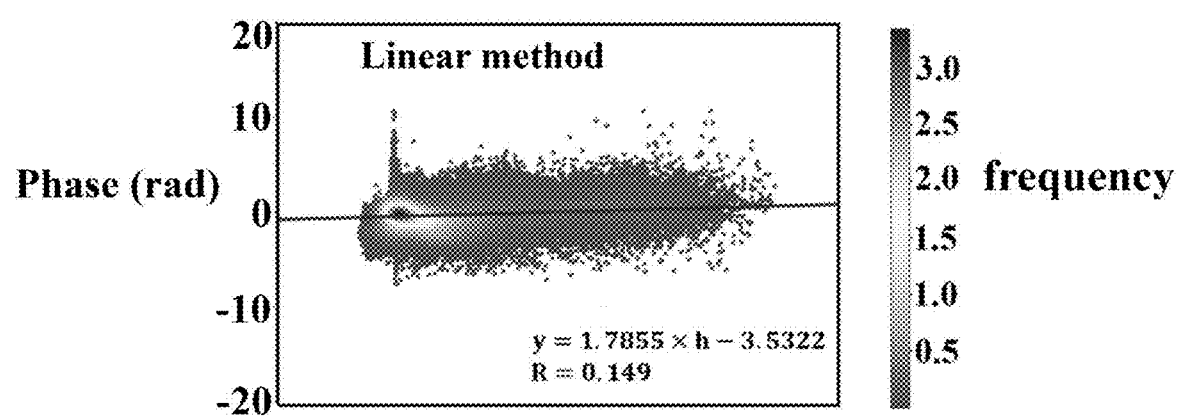
FIG. 5B is a density scatterplot of the interferometric phase values and elevation after Linear correction.
Figure 5C:
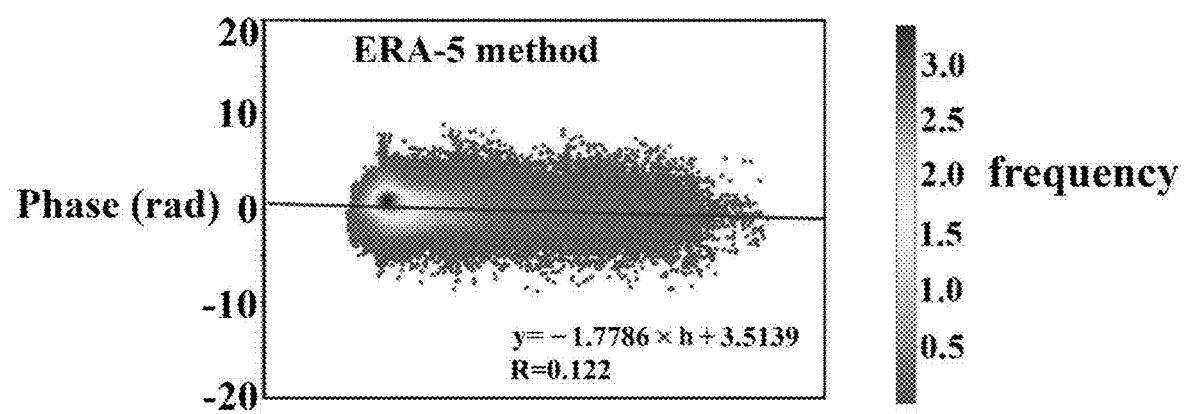
FIG. 5C is a density scatterplot of the interferometric phase values and elevation after ERA-5 correction.
Figure 5D:
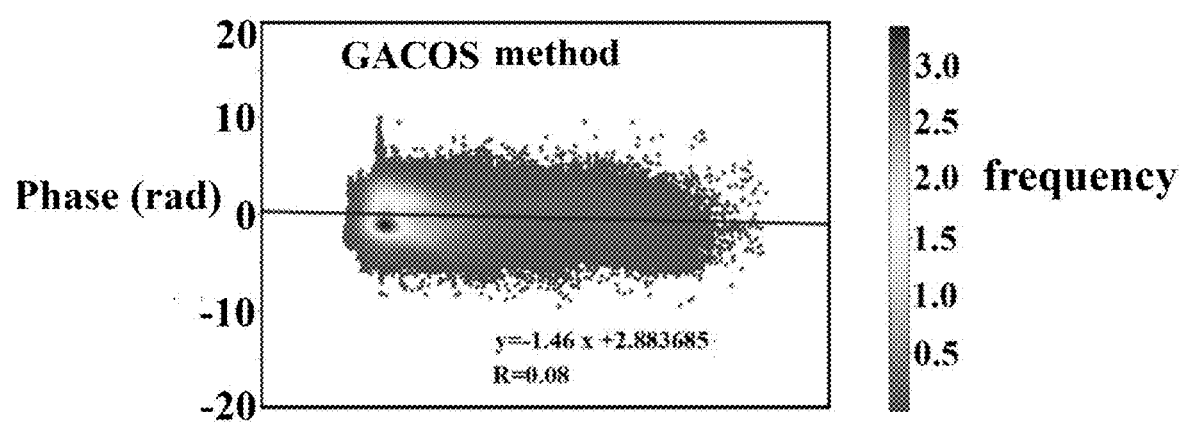
FIG. 5D is a density scatterplot of the interferometric phase values and elevation after GACOS correction.
Figure 5E:
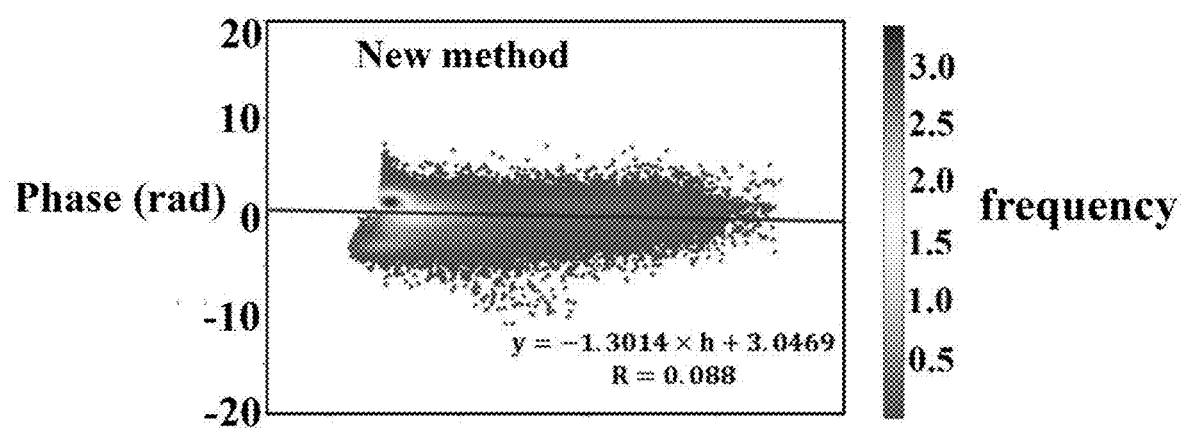
FIG. 5E is a density scatterplot of the interferometric phase values and elevation after disclosed method.

FIG. 5A is the density scatter diagram of interferometric phase value and elevation without atmospheric correction. FIG. 5B, FIG. 5C, FIG. 5D and FIG. 5E is the density scatter diagram of interferometric phase value and elevation after Linear, ERA-5, GACOS and the present disclosure atmospheric delay correction methods in images of Kunming. It is obvious that there are obvious terrain-related phases in the original interferogram, which are mainly caused by vertical stratification delay. After correction by Linear, GACOS, GAMs and the method of the disclosure, The absolute correlation coefficient between interferometric phase and elevation decreased from 11.030 rad/km (4.905 cm/km) to 1.785 rad/km (0.794 cm/km (Linear)), 1.46 rad/km (0.649 cm/km (GACOS)), 1.7786 rad/km (0.791 cm/km (ERA-5)) and 1.301 rad/km (0.579 cm/km (the method of the present disclosure)).

Figure 6A:
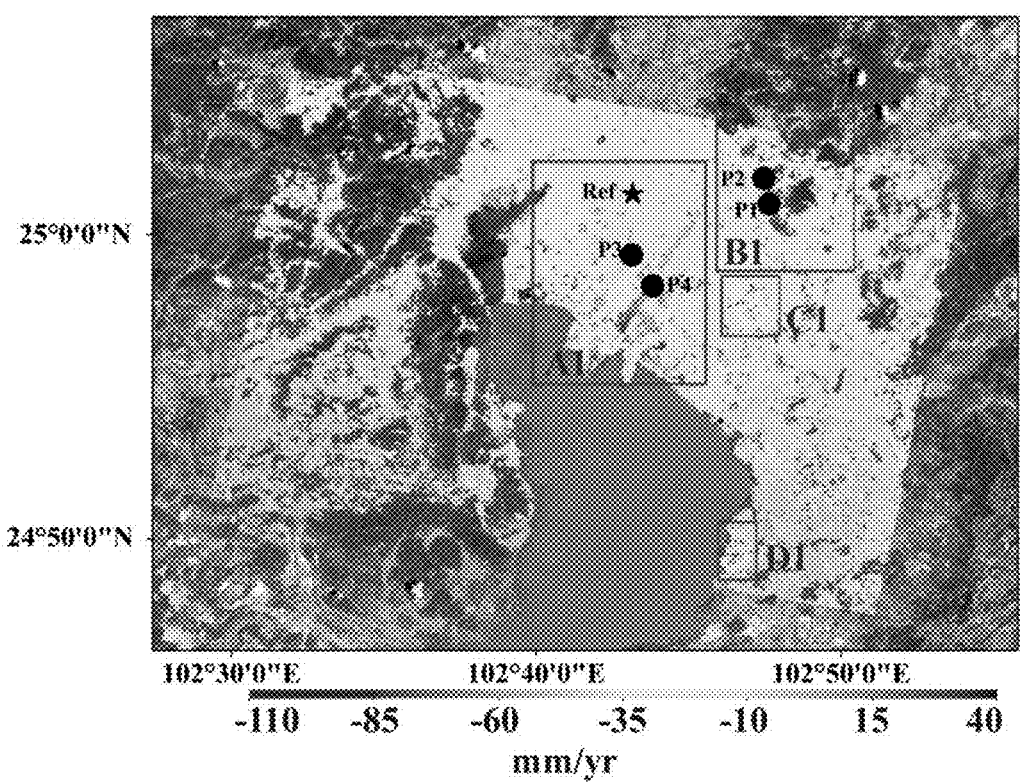
FIG. 6A is a graph of deformation rate before atmospheric correction.
Figure 6B:
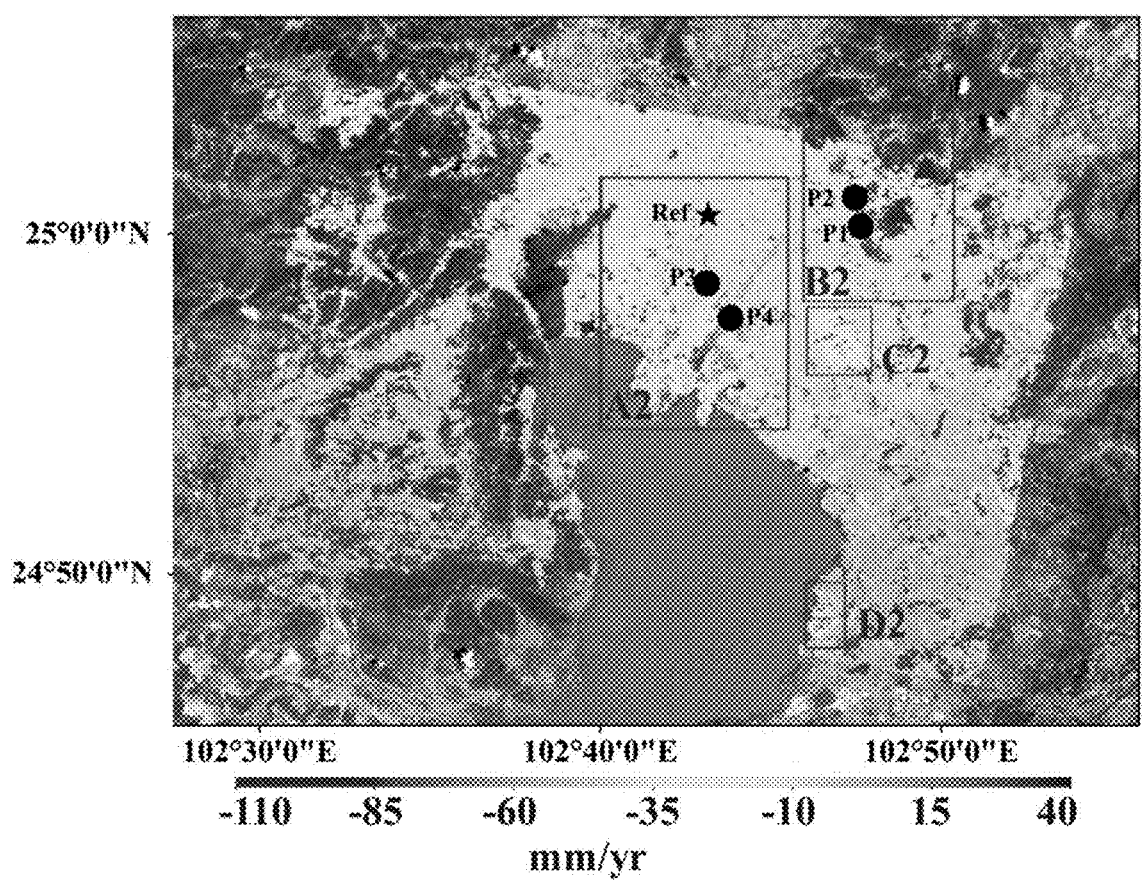
FIG. 6B is a graph of deformation rate after correction by the method of the present disclosure.
Figure 7A:
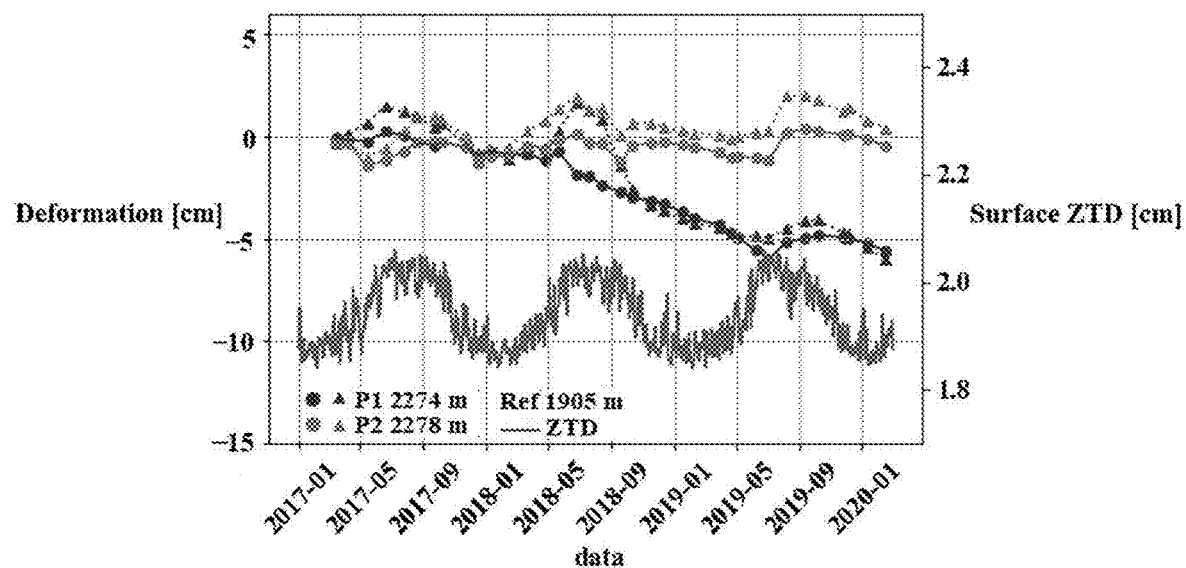
FIG. 7A is a time series of coherent points before atmospheric correction.
Figure 7B:
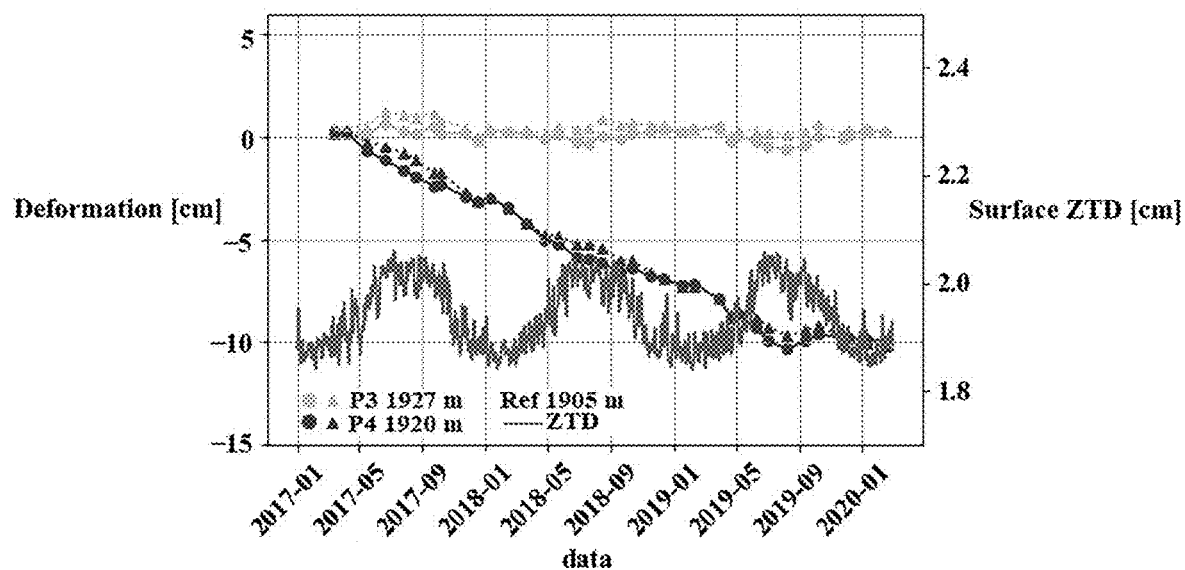
FIG. 7B is a time series of coherent points after correction by the method of the present disclosure.

Optionally, the method of the present disclosure is applied to deformation monitoring in Kunming area, and FIG. 6A shows the average deformation velocity in Kunming area which has not been corrected. FIG. 6B shows the average deformation velocity in Kunming area which has been corrected by the method of the present disclosure. FIG. 7A and FIG. 7B shows the deformation time series of four points with the same name P1, P2, P3 and P4, where P1 and P2 are located in mountainous areas, P3 and P4 are located in densely populated urban areas. The dotted line represents the deformation time series before correction, and the solid line represents the deformation time series after correction. The influence of atmospheric delay at different altitudes on deformation time series have been observed. The elevation difference between P3 and P4 with respect to the reference point is only 15 m and 22 m, respectively, which indicates that the influence of vertical delamination delay is small, and there is no significant difference in deformation time series before and after delay correction (FIG. 7B). At P1 and P2, the altitude difference is about 300 meters compared with the reference point. The seasonal oscillation of deformation time series is calculated by the original method, and there is a maximum oscillation of −4 mm (FIG. 7A). Deformation oscillation shows a similar trend to ZTD oscillation, with peaks and valleys appearing in July-August and January-February every year. This also shows that mountainous areas are obviously affected by tropospheric delay effect, and the method of the present disclosure may effectively relieve the oscillation deviation of atmospheric delay with time.

To sum up, the method is capable of simply and efficiently correcting the tropospheric delay effect in spaceborne InSAR deformation monitoring.

The above-mentioned preferred embodiments are only used to help explain the disclosure, and are not limited to the specific embodiments described. Although the present disclosure has been disclosed with preferred embodiments as above, it is not intended to limit the present disclosure. Any person familiar with this patent may make some changes or modifications to equivalent embodiments by using the technical contents suggested above without departing from the scope of the technical scheme of the present disclosure, but any simple modifications, equivalent changes and modifications made to the above embodiments according to the technical essence of the present disclosure still fall within the scope of the present scheme.

What is claimed is:

1. A time series InSAR tropospheric delay correction method for relieving atmospheric seasonal oscillation, wherein the method comprises following steps performed by a computer:

S1, collecting data: collecting original satellite data and corresponding precise orbit determination ephemeris data, meteorological reanalysis data and digital elevation model data with a resolution of 30 meters under a repeated orbit of N+1 scenes in a study area;

S2, interferogram calculation: registering N slave images with master images, then performing interferometric calculation among multiple master images based on spatial and temporal baseline criteria to obtain M interferograms, simulating topographic phase by digital elevation model, and subtracting from the interferograms to obtain M differential interferograms;

S3, phase unwrapping: selecting high-coherence points higher than a coherence threshold to carry out 3-dimensional phase unwrapping, and using the high-coherence points to fit orbit phase trend by a polynomial to correct orbit error, obtaining unwrapping phase information of the high-coherence points;

S4, extracting surface and stratified meteorological parameter factors: extracting surface parameters and stratified meteorological parameters at hourly intervals based on the collected meteorological reanalysis data, and calculating to obtain a specific humidity factor $q_{sat}$ and a water vapor pressure factor e; wherein the surface parameters comprise air pressure, temperature and dew point temperature, and the stratified meteorological parameters comprise potential height, air pressure, temperature and dew point temperature;

S5, calculating zenith total delay $ZTD_r$ of surface and stratified ZTD: performing integral calculation on stratified zenith wet delay ZWD, zenith hydrostatic delay ZHD, surface ZHD and surface ZWD by using surface and stratified meteorological parameters extracted from the meteorological reanalysis data along a zenith path, so as to obtain $ZTD_r$ and the stratified ZTD;

S6, constructing a time-series InSAR atmospheric delay correction model: constructing a negative exponential function model based on the stratified ZTD and corresponding elevation values, fitting an elevation decline factor β in the model by using a least square algorithm, and then fitting the elevation decline factor β and the $ZTD_r$ in a time dimension with hours as step lengths by using Fourier series functions of annual period, semi-annual period and daily period, and establishing a ZTD spatial and temporal function model of any time grid point;

S7, accurate calculation of atmospheric delay of high-coherence points: based on the ZTD spatial and temporal model constructed in the S6, determining atmospheric delay weight of surrounding ZTD models by a spatial distance between high-coherence points and ZTD models of surrounding grid points, so as to calculate accurate ZTD values of the target points by spatial interpolation, and according to the radar incidence angle parameters, changing the delay from zenith direction to radar line of sight direction, thereby helping the time series InSAR to calculate the deformation displacement, wherein projecting the ZTD onto a radar line of sight by using an incidence angle and a radar wavelength, and calculating to obtain an atmospheric delay phase; and S8, evaluation of model performance: comprehensively evaluating the model performance through internal accord and external accord accuracy verification.

2. The time series InSAR tropospheric delay correction method for relieving the atmospheric seasonal oscillation according to claim 1, wherein in the S4, the specific humidity factor $q_{sat}$ and the water vapor pressure factor e are calculated according to following formulas:

$$\ln e_{sat} = \ln 611.21 + \frac{17.62 \times (dewTemp - 273.16)}{dewTemp - 32.19}$$

$$q_{sat} = \left(\frac{287.0597}{461.525 \times e_{sat}}\right) \Big/ \left(P - \left(1 - \frac{287.0597}{461.525}\right) \times e_{sat}\right)$$

$$e = \frac{q_{sat} \times P}{0.622},$$

wherein dewTemp represents a stratified dew point temperature of each grid point, and a unit is °C.; P represents a stratified air pressure extracted on each grid point, and a unit is hPa.

3. The time series InSAR tropospheric delay correction method for relieving the atmospheric seasonal oscillation according to claim 1, wherein in step S5:
calculating ZHD according to a formula $$ZHD = 10^{-6} \int_{Z_0}^{Z_{top}} k_1 \frac{P}{T} dz,$$

and calculating ZWD according to a formula $$ZWD = 10^{-6} \int_{Z_0}^{Z_{top}} \left(k_2' \frac{e}{T} + k_3 \frac{e}{T^2}\right) dz,$$

wherein $Z_0$ represents a surface elevation, $Z_{top}$ represents an elevation of a highest point, e represents the water vapor pressure factor, and P represents the stratified air pressure, T represents Kelvin temperature; $k_1=0.776$ KPa$^{-1}$, $k'_2=0.233$ KPa$^{-1}$, $k_3=3.75\times10^3$K$^2$ Pa$^{-1}$; calculating ZTD according to a formula ZTD=ZHD+ZWD.

4. The time series InSAR tropospheric delay correction method for relieving the atmospheric seasonal oscillation according to claim 1, wherein a specific method in step S6 is:

S61, restricting a reference point $ZTD_r$ to a surface, and establishing a negative exponential function to describe a variation of stratified atmospheric delay with an elevation at any grid point, $$ZTD = ZTD_r \cdot e^{(h-h_r) \cdot \beta}$$

wherein $h_r$ represents an elevation of a surface reference point; $ZTD_r$ stands for surface ZTD; β represents an elevation decline factor;

S62, taking a one-hour time interval as a step length, calculating a fitted β based on a weighted least square algorithm;

S63, modeling time series $ZTD_r$ and β respectively by using Fourier series function considering annual period, semi-annual period and daily period, $$\beta(DOY, hod) = A_0 + A_1 \cos\left(\frac{DOY}{365.25} 2\pi\right) + A_2 \sin\left(\frac{DOY}{365.25} 2\pi\right) +$$
$$A_3 \cos\left(\frac{DOY}{365.25} 4\pi\right) + A_4 \sin\left(\frac{DOY}{365.25} 4\pi\right) + A_5 \cos\left(\frac{hod}{24} 2\pi\right) + A_6 \sin\left(\frac{hod}{24} 2\pi\right)$$

$$ZTD_r(DOY, hod) = B_0 + B_1 \cos\left(\frac{DOY}{365.25} 2\pi\right) + B_2 \sin\left(\frac{DOY}{365.25} 2\pi\right) +$$
$$B_3 \cos\left(\frac{DOY}{365.25} 4\pi\right) + B_4 \sin\left(\frac{DOY}{365.25} 4\pi\right) + B_5 \cos\left(\frac{hod}{24} 2\pi\right) + B_6 \sin\left(\frac{hod}{24} 2\pi\right)$$

wherein $A_i$ and $B_i$ represent model coefficients of β(DOY, hod) and $ZTD_r$(DOY, hod) respectively, DOY represents a day when the model is input, and hod represents a hour when the model is input, S64, combining the S61 and the S63, obtaining a final spatial and temporal model of ZTD grid: $ZTD = ZTD_r$(DOY, hod)$\cdot e^{(h-h_r) \cdot \beta(DOY, hod)}$.

5. The time series InSAR tropospheric delay correction method for relieving the atmospheric seasonal oscillation according to claim 4, wherein a specific method in step S7 comprises:

step S71, according to positions of the high-coherence points and DEM, extracting X, Y, and Z 3-dimensional information of the target points;

step S72, determining four grid points closest to the target points by using X, Y, and Z 3-dimensional coordinates of the target points, inputting SAR time into the β(DOY, hod) and $ZTD_r$(DOY, hod) models to calculate best $ZTD_r$ and β among four grid ZTD models, and then calculating ZTD values of four surrounding ERA-5 grid models at a target elevation by using elevation values of coherent target points and a ZTD grid spatial and temporal model;

step S73, interpolating the ZTD of the target points through four surrounding grid points with inverse distance weight;

wherein in above steps, a weighted calculation formula of the ZTD of the target points through surrounding four grid points is:

$$f(p, q) = \frac{1/d_i^k}{\sum_{i=1}^{n} d_i^k} f(i, q)$$

wherein f(p, q) is a predicted value of atmospheric delay of point p at elevation q, f(i, q) is a measured value of a known point, and n represents a number of sampling points around a prediction point participating in an interpolation point, wherein n=4 is selected, and $d_i$ represents a distance between the prediction point and a known sampling point; k is a specified power, wherein k=2 is selected; and step S74, according to a relationship between the incidence angle and a wavelength of the satellite radar, converting a zenith ZTD into an atmospheric delay phase in a radar line of sight direction by using a formula, applying for further time series InSAR deformation calculation;

wherein in above steps, a conversion formula is:

$$\varphi_{tropo} = \frac{-4\pi}{\lambda \cos\theta} ZTD, \qquad (5)$$

wherein $\theta$ represents a radar incidence angle and $\lambda$ represents a radar wavelength.

6. The time series InSAR tropospheric delay correction method for relieving the atmospheric seasonal oscillation according to claim 1, wherein a model evaluation in step S8 comprises: an internal accord accuracy evaluation and an external accord accuracy evaluation;

an internal accord accuracy verification is a correlation verification between predicted values of the model and test data, comprising verification of model parameters $ZTD_r$ and verification of accuracy of ZTD at any height of model output; and an external accord accuracy verification comprises qualitative and quantitative evaluation of reduction range of standard deviation STD of interferometric phase after correction, decorrelation performance between phase and the elevation, and performance of relieving seasonal atmospheric delay in displacement time.

* * * * *